United States Patent
Wessels et al.

(10) Patent No.: US 10,806,294 B2
(45) Date of Patent: Oct. 20, 2020

(54) FROTH WAND

(71) Applicant: Koninklijke Douwe Egberts B.V., Utrecht (NL)

(72) Inventors: Hendrikus Christinus Maria Wessels, Utrecht (NL); Hendrik Johan Dees, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 18 days.

(21) Appl. No.: 15/855,354

(22) Filed: Dec. 27, 2017

(65) Prior Publication Data

US 2018/0310753 A1 Nov. 1, 2018

Related U.S. Application Data

(63) Continuation of application No. PCT/NL2016/050466, filed on Jun. 30, 2016.

(30) Foreign Application Priority Data

Jul. 1, 2015 (NL) ..................................... 2015070

(51) Int. Cl.
| | |
|---|---|
| *A23L 2/54* | (2006.01) |
| *A47J 31/44* | (2006.01) |
| *B65D 85/804* | (2006.01) |
| *A23P 30/40* | (2016.01) |
| *A23F 5/24* | (2006.01) |

(52) U.S. Cl.
CPC ............. *A47J 31/4489* (2013.01); *A23L 2/54* (2013.01); *A23P 30/40* (2016.08); *B65D 85/8043* (2013.01); *A23F 5/24* (2013.01); *A23V 2002/00* (2013.01)

(58) Field of Classification Search
CPC ..................................... A23L 2/54; B01F 3/04
USPC ......................................................... 99/323.1
See application file for complete search history.

(56) References Cited

U.S. PATENT DOCUMENTS

| | | | |
|---|---|---|---|
| 1,836,931 A | 12/1931 | Meyer et al. | |
| 3,769,032 A | 10/1973 | Lubsen et al. | |
| 3,823,241 A | 7/1974 | Patel et al. | |
| (Continued) | | | |

FOREIGN PATENT DOCUMENTS

| | | |
|---|---|---|
| CN | 1846581 A | 10/2006 |
| CN | 1897854 A | 1/2007 |
| (Continued) | | |

OTHER PUBLICATIONS

International Search Report and Written Opinion, P107353EP00, Koninklijke Douwe Egberts B.V., 12 pages (dated Oct. 18, 2016).

(Continued)

*Primary Examiner* — Robert A Hopkins
(74) *Attorney, Agent, or Firm* — Fitch, Even, Tabin & Flannery LLP

(57) ABSTRACT

A froth wand comprises a tubular wall having a steam inlet end comprising a steam inlet, a steam outlet end comprising a steam outlet separate from the steam inlet and a steam channel extending between the steam inlet and the steam outlet. The froth wand is a disposable froth wand. The froth wand can comprise a container for containing a beverage base material, such as roasted ground coffee. The tubular wall of the froth wand can comprise an air opening.

15 Claims, 28 Drawing Sheets

(56) References Cited

U.S. PATENT DOCUMENTS

| | | |
|---|---|---|
| 2003/0131735 A1 | 7/2003 | Johnson et al. |
| 2005/0259508 A1 | 11/2005 | Rohde |
| 2006/0230943 A1 | 10/2006 | Stieger et al. |
| 2012/0073449 A1* | 3/2012 | Volonte .............. A47J 31/4489 99/323.1 |
| 2015/0208854 A1 | 7/2015 | Kelly et al. |

FOREIGN PATENT DOCUMENTS

| | | |
|---|---|---|
| CN | 104507370 A | 4/2015 |
| EP | 0 139 849 A1 | 5/1985 |
| EP | 0 144 785 B1 | 7/1988 |
| EP | 0 352 842 A1 | 1/1990 |
| EP | 0 560 609 A1 | 9/1993 |
| EP | 1597992 A1 | 11/2005 |
| EP | 2 625 962 B1 | 6/2017 |
| GB | 2374856 A | 10/2002 |
| WO | 0188187 A1 | 11/2001 |
| WO | 2005063093 A1 | 7/2005 |
| WO | WO-2007/043873 A1 | 4/2007 |
| WO | 2008049162 A1 | 5/2008 |
| WO | 2010121299 A1 | 10/2010 |
| WO | WO-2014/083422 A2 | 6/2014 |
| WO | WO-2015/099531 A1 | 7/2015 |

OTHER PUBLICATIONS

Russian Office Action and Search Report dated Jul. 19, 2019, for RU application No. 2018103747/12, with English Translatoin (9 pgs.).

International Search Report and Written Opinion, dated Oct. 14, 2016, for International Application No. PCT/NL2016/050466 (14 pgs).

International Preliminary Report on Patentability, dated Jan. 2, 2018, for International Application No. PCT/NL2016/050466 (9 pgs).

Examination Report, dated Jan. 17, 2019, for European Application No. 16745527.8 (3 pgs).

First Office Action and Search Report, dated Oct. 23, 2019, for Chinese Application No. 201680039386.4, with English translation (17 pgs.).

* cited by examiner

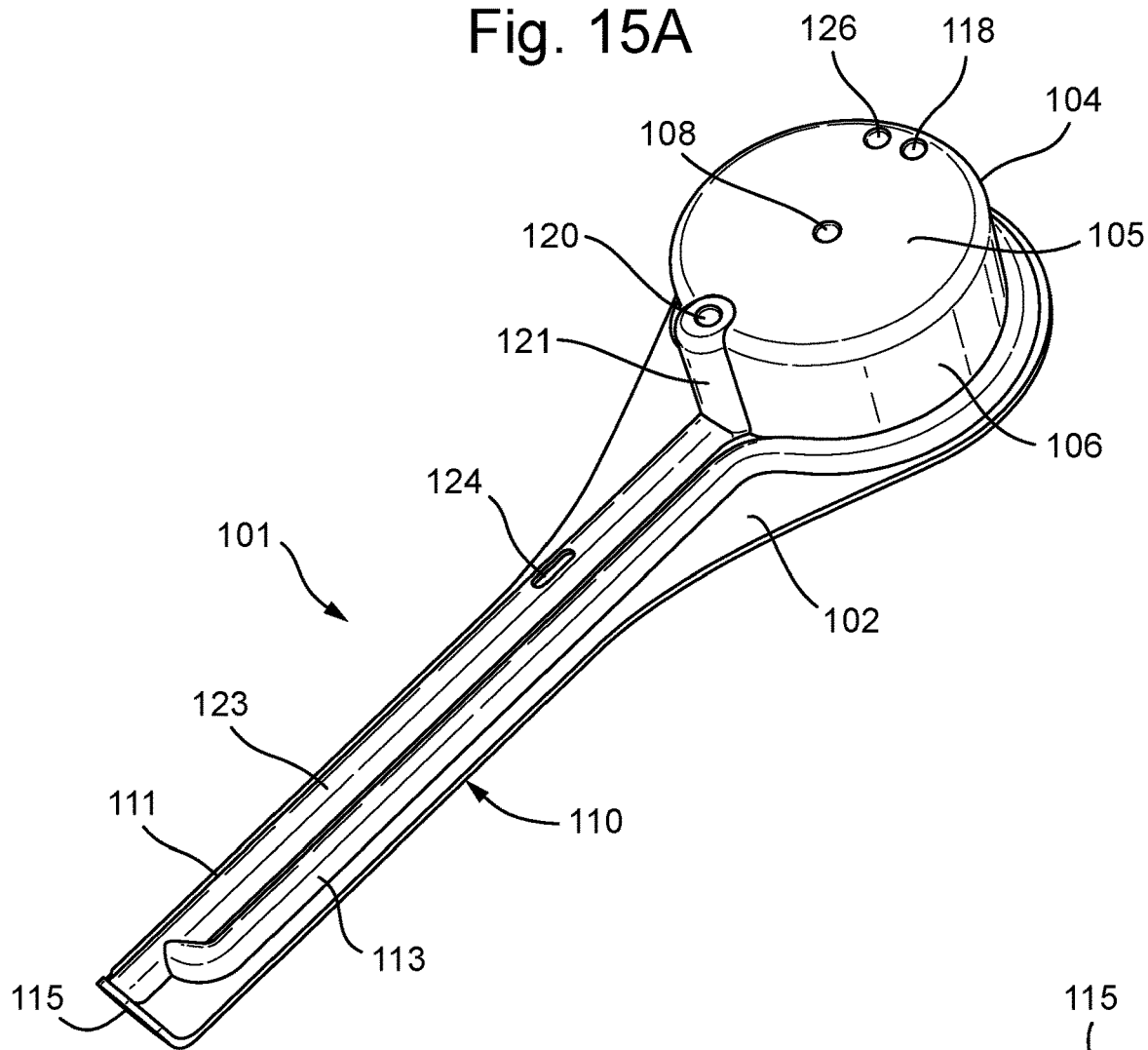
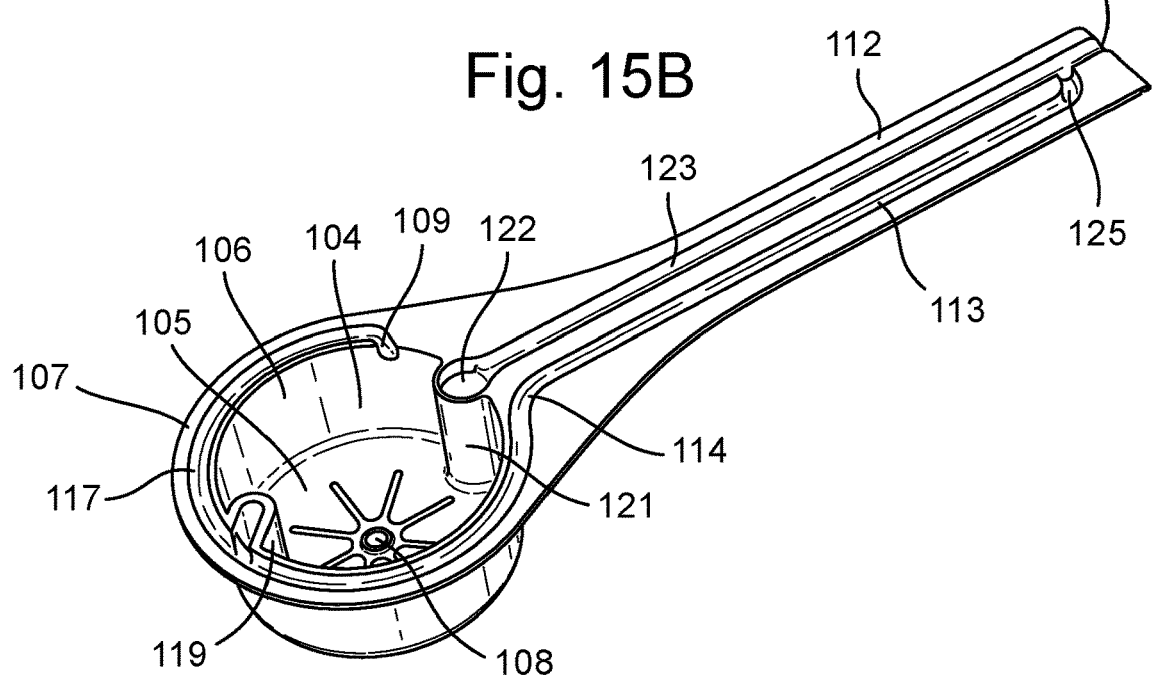

Fig. 15C
Fig. 15D
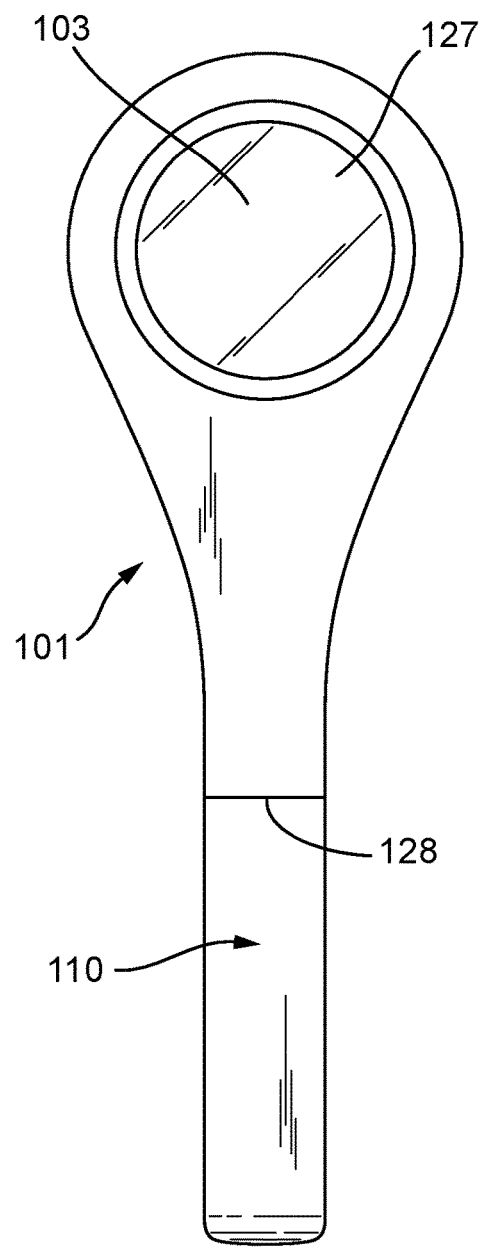
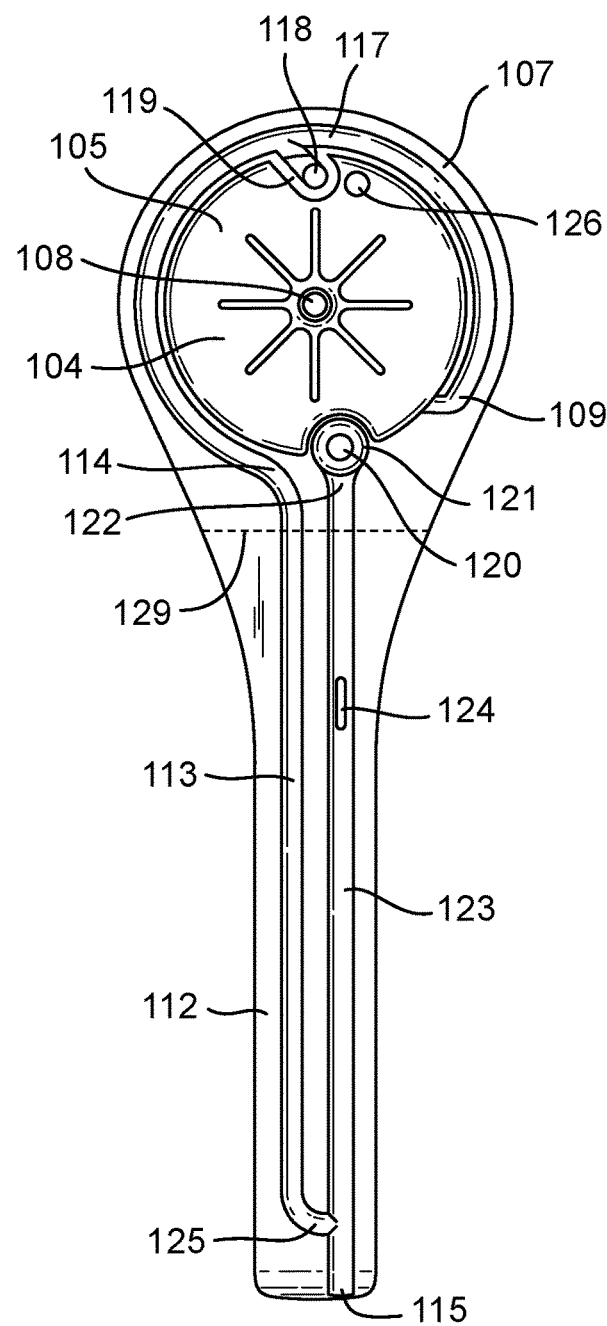

Fig. 18A
Fig. 18B
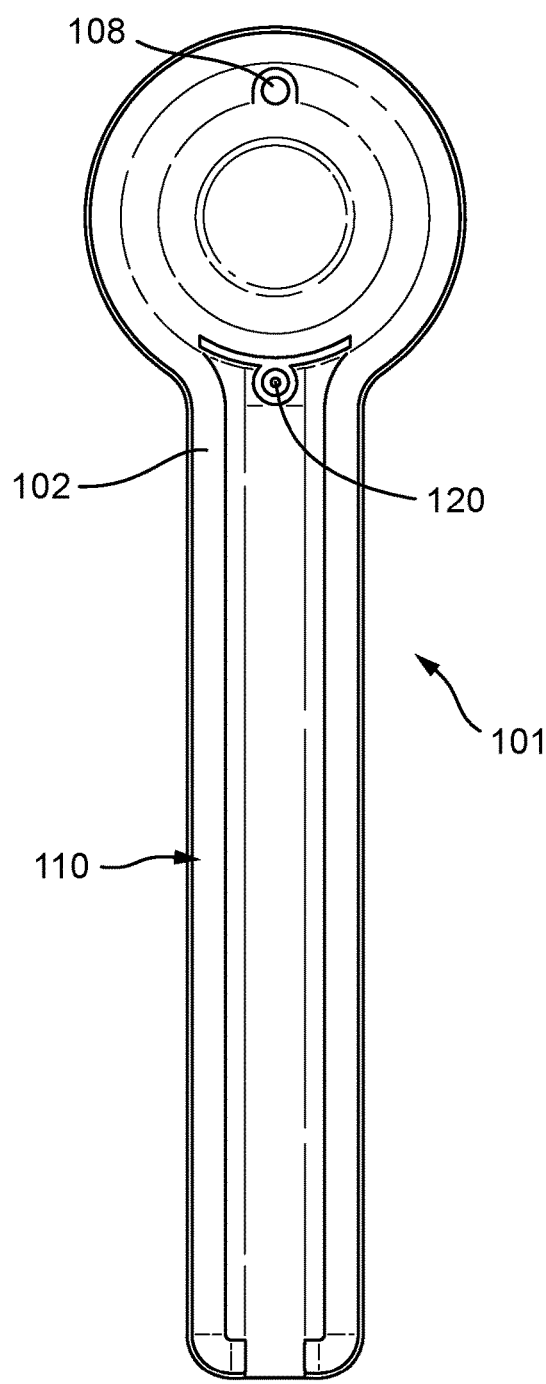
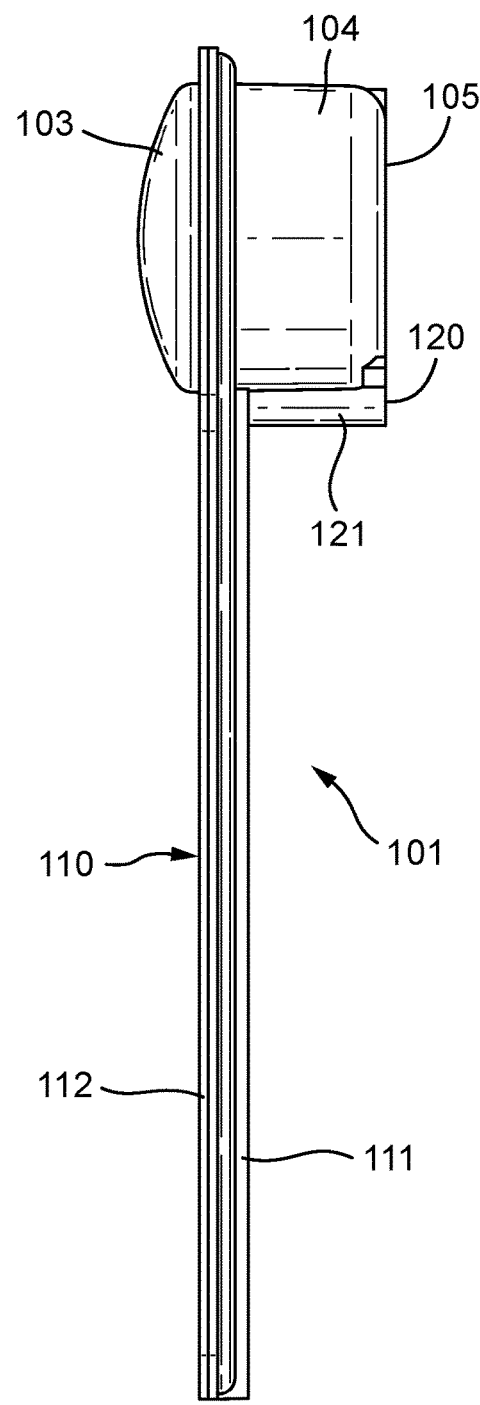

Fig. 18D1

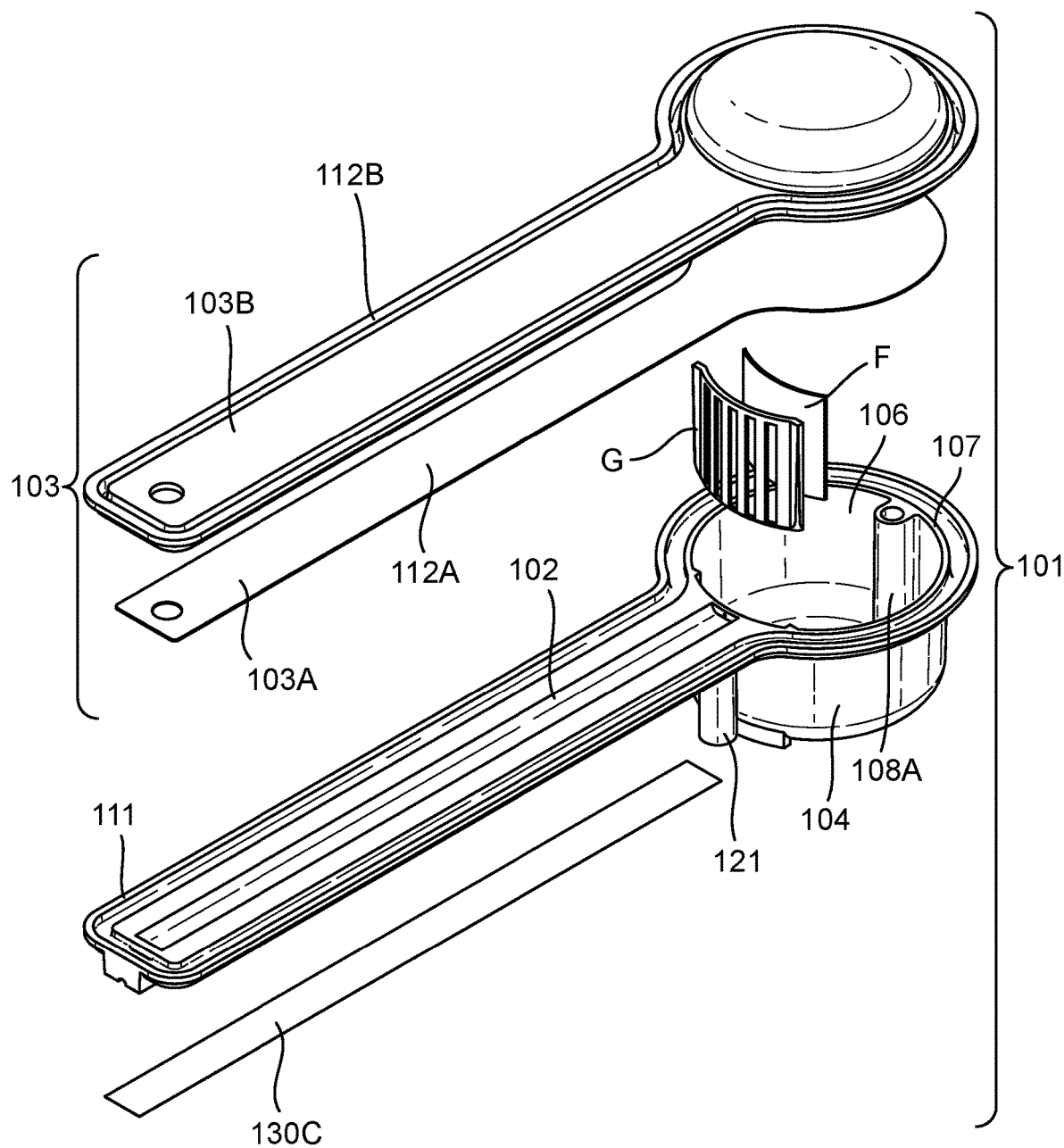

Fig. 19A
Fig. 19B
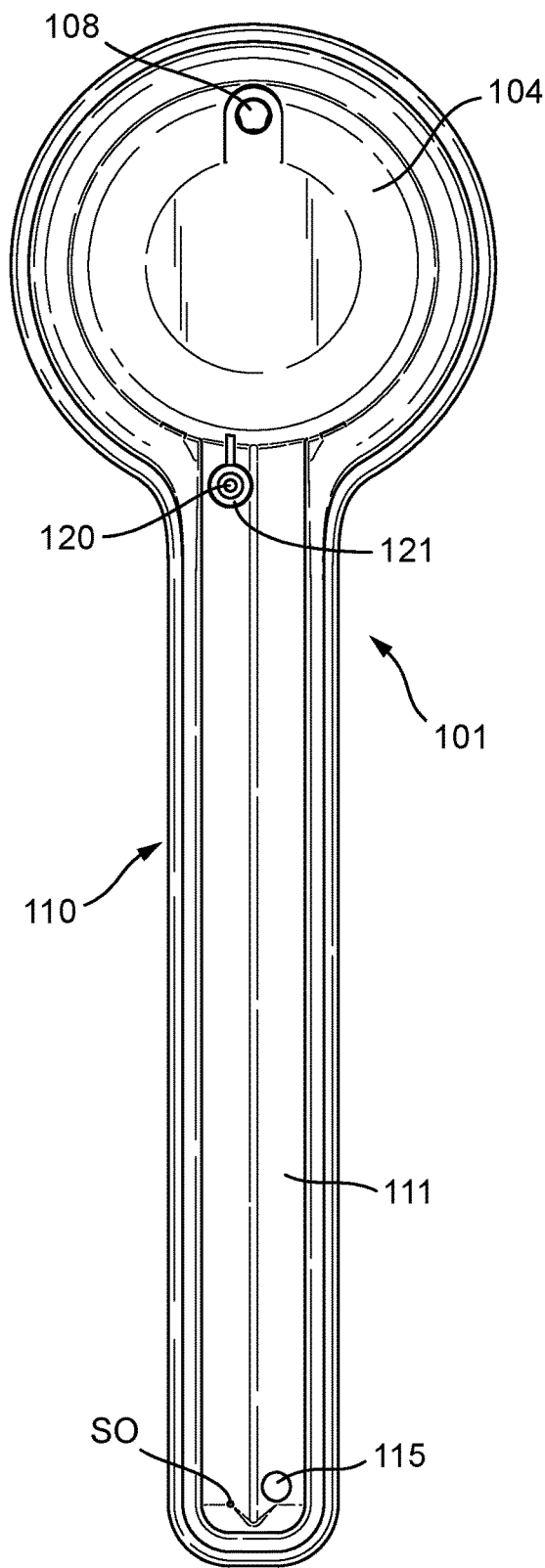
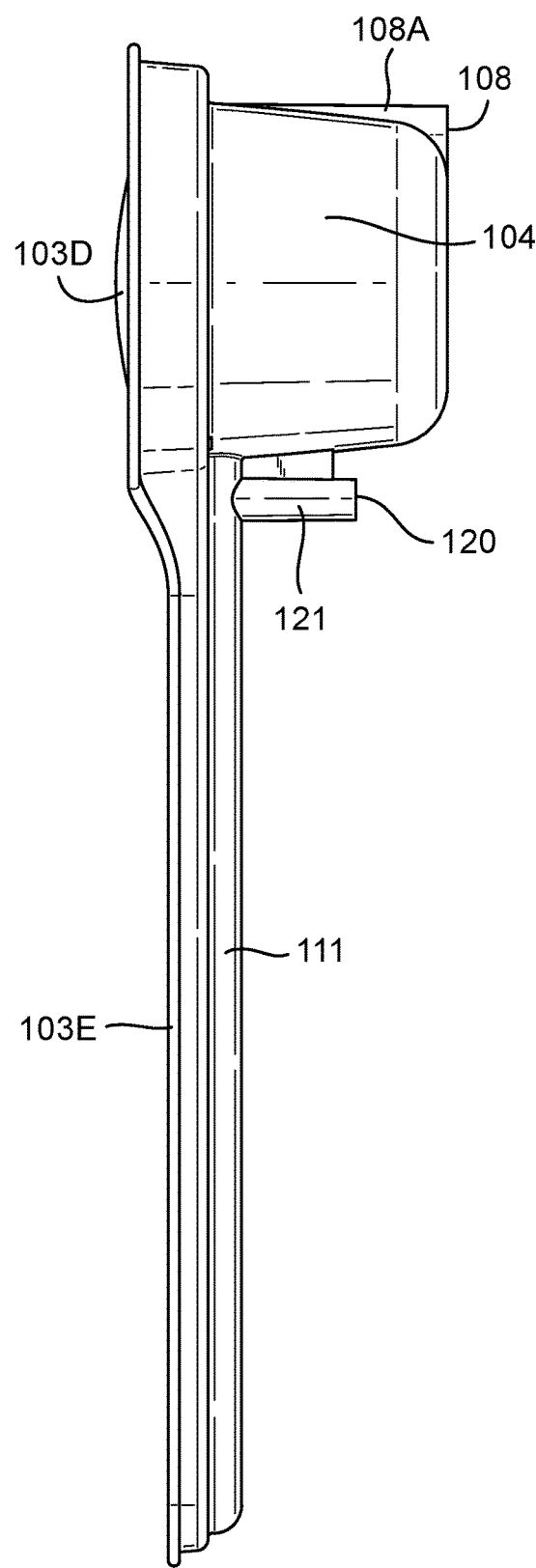

FROTH WAND

CROSS-REFERENCE TO RELATED APPLICATIONS

This application is a continuation of PCT/NL2016/050466, filed Jun. 30, 2016, which claims the benefit of and priority to Netherlands Application No. NL 2015070, filed Jul. 1, 2015, the entire contents of each of which are incorporated herein by reference.

BACKGROUND

The invention generally relates to a froth wand. Such a froth wand can be used in a system for heating and frothing a beverage.

Such a froth wand and a system for heating and frothing a beverage is e.g. known from US-A1-2003/0131735. This known system comprises an elongate frothing wand that includes a generally tubular external sleeve and an inner core within the external sleeve. The inner core defines a steam conduit configured to pass steam from a supply end of the froth wand to an expulsion end of the froth wand configured to eject steam into the beverage. The inner core further includes a coupling mechanism, configured to facilitate connection of the froth wand to a steam supply of beverage preparation device. The coupling mechanism may include threads, clamps, grooves, quick connect mechanisms, or other suitable fasteners complementarily configured to connect with steam supply and allow for easy de-coupling and re-coupling of the frothing wand from the steam supply to facilitate maintenance and cleaning. In addition the external sleeve may be easily removed facilitating cleaning and repair. For example, the external sleeve may be easily removed after a beverage of one flavor is prepared, so as to minimize the risk of imparting an undesired flavor to a subsequently prepared beverage. In addition, several different external sleeves individually configured to accommodate specific functions may be interchangeably coupled to the frothing wand, thus diversifying the utility of the frothing wand. Although the known system allows for removing the froth wand in order to clean the froth wand, de-coupling and re-coupling of the froth wand including cleaning the froth wand requires a lot of time. In particular it is desirable from a hygienic point of view that the froth wand is de-coupled, cleaned and re-coupled each time is has been used and this makes the use of such a system somewhat impractical, with the result that users of the system frequently refrain from cleaning the froth wand after it has been used, which could lead to health risks. In addition, a contaminated froth wand may also contaminate the inside of the beverage preparation device, which inside device contamination may be hard to remove.

SUMMARY

It is therefore an object of the invention to provide a froth wand with which a beverage can be heated and frothed hygienically. It is furthermore an object of the invention to provide a froth wand which is very user friendly thereby providing a more appealing manner of preparing a beverage. It is a further object of the invention to provide an alternative froth wand.

In order to achieve at least one of the above identified objects the invention provides froth wand comprising a tubular wall having a steam inlet end comprising a steam inlet, a steam outlet end comprising a steam outlet separate from the steam inlet and a steam channel extending between the steam inlet and the steam outlet, wherein the froth wand is a disposable froth wand. By using a disposable froth wand in stead of a reusable froth wand the system for heating and frothing a beverage can be used in a very hygienic manner, while at the same time two separate beverages can be prepared in a shorter time period since cleaning of a used froth wand can be dispensed with.

In an environmental advantageous embodiment of a froth wand according to the invention the disposable froth wand is made of biodegradable material.

Amongst other things dependent on the preference of a user and the kind of beverage to be heated or frothed with the froth wand the steam outlet can extend radially through the tubular wall or can be arranged at a free end of the froth wand extending in longitudinal direction. It has appeared that the orientation of the steam outlet influences the frothing and this orientation can thus be used to adapt the frothing to at least some extent to the preference of a user.

In a further embodiment of a froth wand according to the invention heating a frothing a beverage can be realized in a reproducible and effective manner when the steam outlet is a circular opening having a diameter of between 1.0 mm and 2.0 mm.

In addition, frothing seems to be influenced by the number of steam openings forming the steam outlet, and consequently in a further embodiment of a froth wand according to the invention the steam outlet comprises a plurality of steam outlet openings.

In a still further embodiment of a froth wand according to the invention the froth wand comprises a porous element adjacent the steam outlet. It has appeared that frothing can be influenced by providing a porous element adjacent or even in the steam outlet and such a porous element can thus be used to adapt the frothing to at least some extent to the preference of a user.

In an advantageous embodiment of a froth wand according to the invention the steam channel has a diameter of between 4 mm and 10 mm. In this manner heating of frothing of a beverage can be realized effectively.

In a further embodiment of a froth wand according to the invention the tubular wall of the froth wand has a thickness of between 0.4 and 0.6 mm, preferably a 0.5 mm wall thickness. It has appeared that a froth wand with such a relative small thickness can withstand the operational parameters during its use and furthermore can be manufactured with relative low cost due to the relative low use of material.

When the froth wand is made of a material having a low thermal mass in a range of 1 to 20 gram, a used froth wand (i.e. a froth wand through which steam has passed) can be manually held at least for a time sufficient for disposing the froth wand. Preferably the length of the disposable froth wand is between 100 and 120 mm, in particular 110 mm.

In an embodiment of a froth wand according to the invention the froth wand comprises a blade at the steam outlet end. In this manner the froth wand can be efficiently used as a stirrer in the prepared beverage. The blade can be shaped either asymmetrical or symmetrical with regard to a longitudinal axis of the tubular wall. In order to facilitate stirring the froth wand can then comprise a grip at the steam inlet end. Such a grip can then be shaped either asymmetrical or symmetrical with regard to a longitudinal axis of the tubular wall.

In a particular embodiment of a froth wand according to the invention the froth wand comprises an upper flange at the steam inlet end. In this manner it is possible that a relatively simple froth wand holder can be used for holding the froth wand in a device for frothing a beverage which is mechanically simple but still very reliable. It is then especially advantageous when the upper flange has a flat end face and/or when the froth wand comprises a retention flange spaced at a distance from the top flange. In addition, such flange(s) provide additional rigidity to the froth wand.

In a further embodiment of a froth wand according to the invention an outside diameter of the tubular wall increases from the steam outlet end towards the steam inlet end. Alternatively the tubular wall can comprise a portion extending from the steam inlet end, which portion has a decreasing outside diameter. With such froth wands it is possible to use froth wand holders for holding the froth wand which are mechanically simple but still very reliable.

In a still further embodiment of a froth wand according to the invention the tubular wall of the froth wand comprises an air opening, preferably comprising one or more holes, wherein the air opening or the one or more holes are preferably shaped as a slot extending parallel to a longitudinal axis of the tubular wall. In this manner a more consistent flow of steam through the steam channel can be obtained.

In an advantageous embodiment the froth wand can comprise a circulation channel provided on the tubular wall near the steam outlet end of the froth wand, said circulation channel having an intake opening and a separate outlet opening which latter is positioned adjacent the steam outlet, said circulation channel being preferably substantially parallel to the steam channel of the froth wand. In this manner a circulation of steam and milk in the circulation channel can be realized for more efficiently heating and frothing the beverage milk. The circulation channel can be formed by an addition tube arranged on the tubular wall near the steam outlet end of the froth wand or by a coaxial circulating sleeve forming the circulation channel between the inner wall of the circulating sleeve and the outer wall of the froth wand.

In a still further embodiment of a froth wand according to the invention the froth wand comprises a fill indication mark. Such a fill indication mark can e.g. be a minimum fill level to ensure that a cup in which a beverage to be frothed by the froth wand is poured is filled with a sufficient amount so that the steam outlet extends to below the liquid level. Alternatively or additionally the fill indication mark can be a proposed fill indication, meaning that a beverage which is filled into a cup—into which the froth wand extends—up to the proposed fill indication mark can be heated and frothed in a generally accepted manner. Further an additional maximum fill indication mark can be provided which ensures that a beverage poured into a cup up to this maximum fill indication mark does not flow over the edge of the cup when the beverage is heated and frothed.

In a still further embodiment of a froth wand according to the invention the froth wand comprises a container for containing a beverage base material, said container including a base body and a cover, said base body comprising a beverage base material chamber defined by a chamber bottom and a chamber wall at the perimeter of the chamber bottom, the chamber of the base body being open at the side opposite the chamber bottom, said chamber wall being provided with a sealing surface at its free end opposite the chamber bottom, the cover being attached to the sealing surface of the chamber wall for closing the beverage base material chamber, said container comprising an intake opening for taking in an extraction medium to the beverage base material chamber and a dispensing opening for dispensing a beverage from the beverage base material chamber. In this manner the froth wand can also be used to prepare a beverage based on the beverage base material.

It is then preferred that the tubular wall forms an elongated handle extending in a direction having a radial component outward from the beverage base material chamber, said elongated handle being integral with the base body and comprising a handle bottom and a handle sealing flange which is flush with the sealing surface of the chamber wall, said dispensing opening for dispensing a beverage from the beverage base material chamber being provided in the sealing surface of the chamber wall, said handle being provided with an outlet channel extending from an upstream channel inlet communicating with the dispensing opening to a downstream channel outlet provided at the free end of the handle, said cover being furthermore attached to the sealing flange of the handle for closing the outlet channel in a direction opposite the handle bottom. By using a container having a handle with an outlet channel for dispensing a prepared beverage the beverage prepared by using such a container when it is installed in a beverage preparing apparatus need not come into contact with parts of the beverage preparing apparatus. In this manner regular cleaning of the beverage preparing apparatus can be dispensed with and in addition remainders of a beverage prepared earlier do not influence the taste of a (different kind of) beverage prepared thereafter. In this manner it is possible to use containers containing a variety of different beverage base materials in only a single beverage preparation apparatus.

In a further embodiment of a froth wand according to the invention the height of the chamber wall is at least four times, preferably five times, more preferred six times larger than the height of the elongated handle. In this manner the handle can be handled by a user for preparing a beverage quite easily.

In a further embodiment of a froth wand according to the invention the sealing flange of the handle surrounds the channel outlet, the cover is attached to the sealing flange for closing the channel outlet and the cover is weakened at the location of the channel outlet for being opened by beverage dispensed through the outlet channel. In this manner the inside of the container can be sealed off completely from the surroundings before it is used in a beverage preparation apparatus thereby improving hygiene. In addition by locally weakening the cover so that it can be opened by pressure of the beverage under preparation no additional means on a beverage preparation apparatus are necessary for opening the beverage exit of the container.

Preferably the intake opening for taking in an extraction medium to the beverage base material chamber is formed by a pierceable extraction medium intake portion provided in the chamber bottom.

In another embodiment of a froth wand according to the invention the container further comprises an extraction medium inlet pipe extending from the pierceable extraction medium intake portion into the beverage base material chamber.

In a still further embodiment of a froth wand according to the invention said dispensing opening for dispensing a beverage from the beverage base material chamber is provided in the sealing surface of the chamber wall. A compact froth wand can then be provided in an embodiment in which the upstream channel inlet communicates with the dispensing opening via a peripheral dispensing channel provided in the sealing surface of the chamber wall.

In an alternative embodiment of a froth wand according to the invention said dispensing opening for dispensing a beverage from the beverage base material chamber is provided by a dispensing hole in the chamber wall.

In a further embodiment of a froth wand according to the invention the chamber bottom is provided with a pierceable extraction medium bypass intake portion, in that the chamber wall is provided with an extraction medium bypass pipe extending from the pierceable extraction medium bypass intake portion to the upstream channel inlet of the outlet channel of the handle. By using an extracting medium bypass a more consistent output of beverage from the container can be obtained and furthermore the strength of the prepared beverage can be adjusted via said extracting medium bypass. It is then in particular advantageous when the extraction medium bypass pipe discharges into the peripheral dispensing channel provided in the sealing surface of the chamber wall.

In a still further embodiment of a froth wand according to the invention the steam inlet is provided in the container (preferably the chamber bottom), said steam inlet having a pierceable steam inlet portion, wherein the steam channel extends in the handle from an upstream steam channel inlet to a downstream steam channel outlet provided at the free end of the handle, wherein the container is further provided with a steam inlet pipe extending from the pierceable steam inlet portion to the upstream steam channel inlet of the steam outlet channel of the handle, and said cover is furthermore attached to the sealing flange of the handle for closing the steam channel in a direction opposite the handle bottom. In this manner the container itself can be used to supply steam, e.g. into fresh milk poured into a cup to prepare milk foam. As described above the steam channel can be provided with an air inlet slot provided in the handle bottom to provide a more consistent flow of steam through the steam channel.

In an advantageous embodiment of a froth wand according to the invention the outlet channel discharges into the steam channel at a distance from the free end of the handle. In this manner prepared beverage is introduced in the steam so that it is possible to provide the prepared beverage with a structure that can enhance taste and visual appearance.

In a particular embodiment of a froth wand according to the invention the chamber bottom is provided with a pierceable aroma vent portion. In this manner it is possible to let aroma escape from the container during extraction of the beverage within the beverage base material chamber which can provide the user of the container with a more pleasant experience while preparing the beverage.

In a further embodiment of a froth wand according to the invention the cover is at least partially transparent, preferably opposite the chamber bottom. In this manner it is possible for a user to check the contents of the chamber but also to actually witness the extraction process which provides an additional sense enhancing experience while preparing the beverage.

To improve hygiene the outer surface of the chamber bottom of a froth wand according to an embodiment of the invention is provided with a manually removable sealing membrane. Alternatively or in addition the froth wand can be provided with a manually removable paper sleeve at least surrounding the handle.

In an embodiment of a froth wand according to the invention the base body is provided with a tear line between the beverage base material chamber and the handle for manually removing the handle. In this manner the handle can be removed in container variants that do not require steam to be introduced in an additional ingredient and to allow the use of the container in other beverage preparing apparatuses.

In case the froth wand is provided with an identifier provided with data, said data being readable by a reader in an apparatus for preparing a beverage, the beverage preparing apparatus being controlled in dependence on the data it is possible to control the apparatus such as to prepare the beverage in an optimal, default manner, e.g. by adjusting the temperature and amount of hot water to be supplied into the beverage base material chamber and/or the temperature and duration of supplying steam into an amount of milk poured into a cup in dependence of the read data. Preferably the identifier comprises protrusions and/or depressions in the chamber bottom.

In a particularly advantageous embodiment of a froth wand according to the invention the base body is molded from bio plastics, such as PLA (TBC), so that a used froth wand is biodegradable and does not form an environmental impact.

Although a container of a froth wand according to the invention is suitable for containing a large variety of beverage base materials the invention is in particular advantageous when the container contains an amount of roasted ground coffee for a single serving.

DESCRIPTION OF THE DRAWINGS

Further features and advantages of the present invention will appear from reading the description which follows, provided by way of non-limiting example and with reference to the accompanying drawings, in which:

FIG. 15A shows a first embodiment of a froth wand according to the invention comprising a container in a perspective view showing the bottom of the container;

FIG. 15B shows the first embodiment of the froth wand comprising a container according to the invention in a perspective view showing the top of the container;

FIG. 15C shows the first embodiment of the froth wand comprising a container according to the invention in a view showing the top of the container covered by a partially transparent cover;

FIG. 15D shows the first embodiment of the froth wand comprising a container according to FIG. 1C with the cover removed;

FIG. 18A shows a third embodiment of a froth wand comprising a container according to the invention in a view showing the bottom of the container;

FIG. 18B shows the third embodiment of the froth wand comprising a container according to FIG. 18A from the side;

FIG. 18D1 shows the third embodiment of the froth wand in cross-section comprising the container;

FIG. 18E shows the third embodiment of the froth wand comprising a container according to the invention in an exploded view in perspective;

FIG. 19A shows a fourth embodiment of a froth wand comprising a container according to the invention in a view showing the bottom of the container;

FIG. 19B shows the fourth embodiment of the froth wand comprising a container according to FIG. 19A from the side;

DETAILED DESCRIPTION

Figure 1:
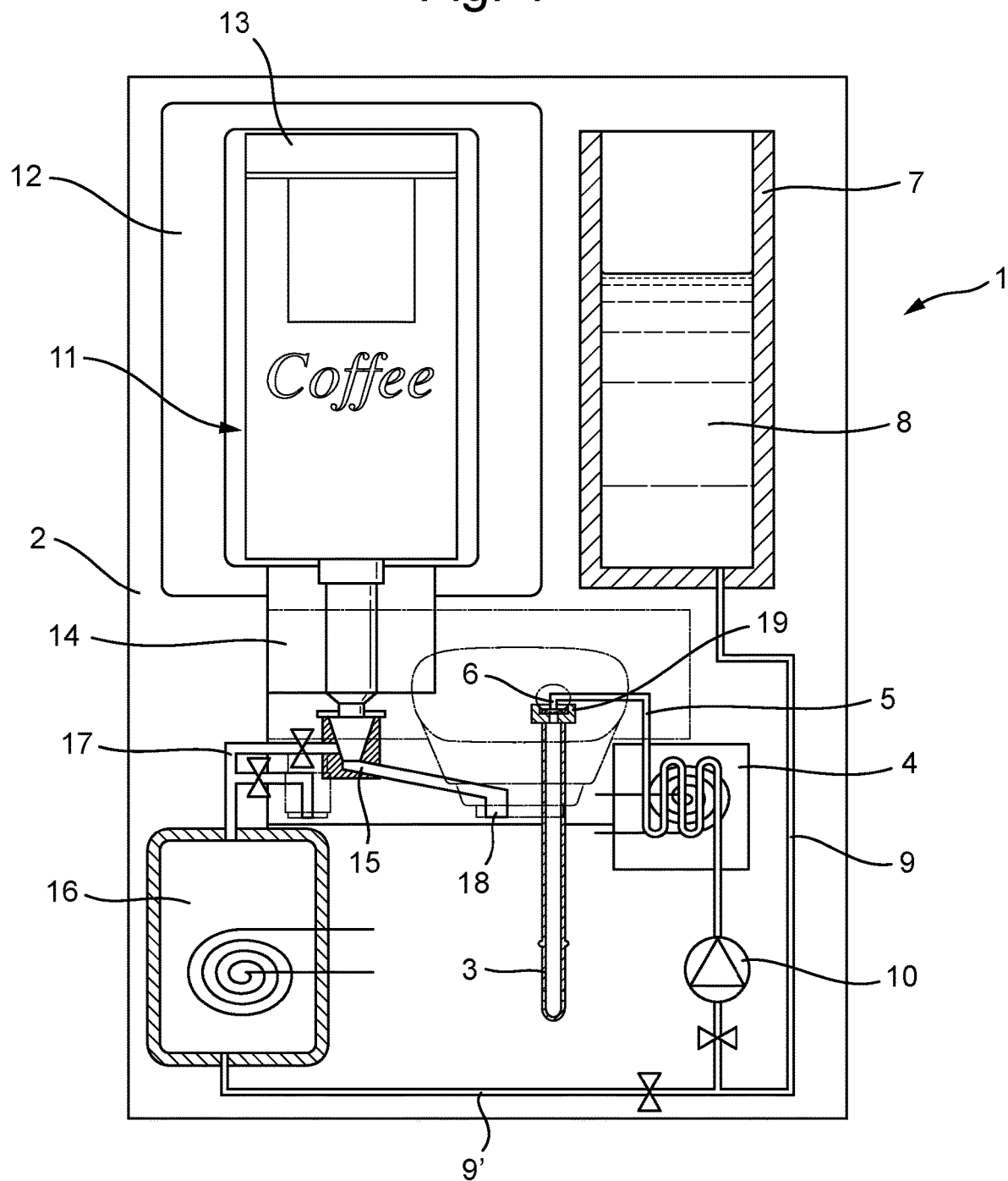
FIG. 1 schematically shows in front view and partly broken away an embodiment of an exemplary system for heating and frothing in which an embodiment of a froth wand according to the invention can be used.

In FIG. 1 an example of a system 1 for heating and frothing using an embodiment of a froth wand according to the invention is schematically shown in front view partly broken away. The system 1 comprises a device 2 for heating and frothing a beverage and a froth wand 3.

The device 2 includes a steamer 4, for example a thermoblock, a steam conduit 5 connecting the steamer 4 to a steam nozzle 6. A reservoir 7 for cold water 8 is provided in the device 2, which cold water reservoir 7 is connected to the steamer 4 via a cold water conduit 9 and a cold water pump 10 for supplying cold water to the steamer 4.

In the example shown in FIG. 1 the device 2 further comprises a liquid coffee dispenser 11 for dispensing liquid coffee. In the shown example the liquid coffee dispenser 11 comprises a chamber 12 for receiving a package 13 of concentrated liquid coffee. The liquid coffee dispenser 11 further comprises a coffee dosing apparatus 14 for dosing an amount of concentrated liquid coffee into a mixing chamber 15. Heated water is supplied from a water heater 16 via a water conduit 17 to the mixing chamber 15 to dilute the concentrated liquid coffee to a liquid coffee having a more consumable concentration. This liquid coffee can be dispensed into a cup (not shown in FIG. 1) from a liquid coffee outlet 18. In the shown example the water heater 16 is supplied with cold water from the cold water reservoir 7 by means of the cold water conduit 9 and an extension 9' thereof. In other examples the water heater 16 can be supplied with water from a water source separate from the cold water reservoir 7.

Figure 2:
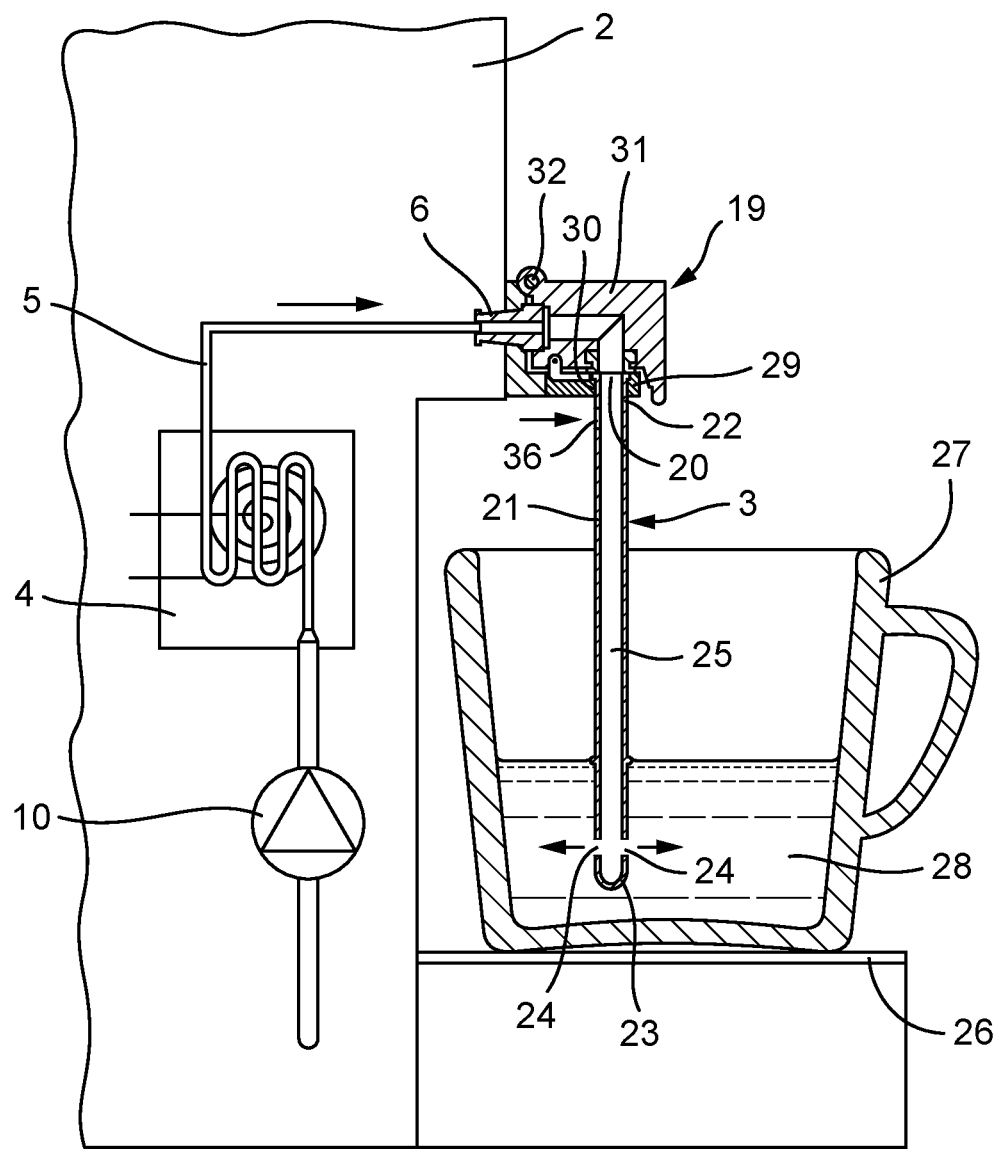
FIG. 2 schematically shows a part of the system of FIG. 1 in side view with a cup placed on a cup support.

The device 2 further comprises a froth wand holder 19 for removably holding the froth wand 3. The froth wand holder 19 is arranged for holding the froth wand 3 at least in an operational position (as shown in FIG. 2) in the device 2 in which the steam nozzle 6 is in communication with a steam inlet 20 of the disposable froth wand 3. The froth wand holder 19 comprises a horizontal seat 29 for holding the froth wand 3. For this the horizontal seat 29 has a froth wand opening 30 for receiving a part of the froth wand 3. The froth wand holder 19 further comprises a lid 31 which is mounted displaceable relative to the horizontal seat 29, in the shown example the lid 31 is mounted on a rotation shaft 32 so that it can be rotated away from the seat 29 so that a froth wand 3 can be placed in the froth wand opening 30 or taken out therefrom (the so called froth wand insertion position of the froth wand holder 19) or rotated towards the seat 29 to enclose a froth wand 3 positioned in the froth wand holder 19 which is then situated in the operational position.

The froth wand 3 according to the invention is a disposable froth wand comprising a tubular wall 21 having a thickness of between 0.4 and 0.6 mm, preferably a 0.5 mm wall thickness, and having a steam inlet end 22 comprising the steam inlet 20, a steam outlet end 23 comprising at least one steam outlet 24 separate from the steam inlet 20 and a steam channel 25 having a diameter of between 4 mm and 10 mm extending between the steam inlet 20 and the steam outlet 24. In the embodiment shown in FIG. 2 the steam outlet 24 extends radially through the tubular wall 21. Furthermore the tubular wall 21 of the froth wand 3 comprises an air opening 36 extending through the wall. In the shown embodiment the air opening is slot shaped, the slot extending parallel to a longitudinal axis of the tubular wall 21. In other embodiments the air opening can be formed by one or more round holes.

The disposable froth wand 3 is made of biodegradable material, in particular a material having a low thermal mass in a range of 1 to 20 gram.

In FIG. 2 it is further shown that the system 1, in particular the device 2, comprises a support 26 for a cup 27, and that the froth wand holder 19 and the support 26 are mutually arranged such that the froth wand 3 held in the froth wand holder 19 extends into the cup 27 positioned on the support 26 in the operational position of the froth wand holder. Indicated in FIG. 2 is further an amount of milk 28, as first beverage while the liquid coffee is also called second beverage in this description, and that the disposable froth wand 3 has a length between 100 and 120 mm, preferably 110 mm, such that the steam outlet 24 is positioned below the milk meniscus.

Referring to FIGS. 3A-3L a method of preparing a beverage by heating and frothing using the froth wand 3 as shown in of FIGS. 1 and 2 will be described in the following.

Figure 3A:
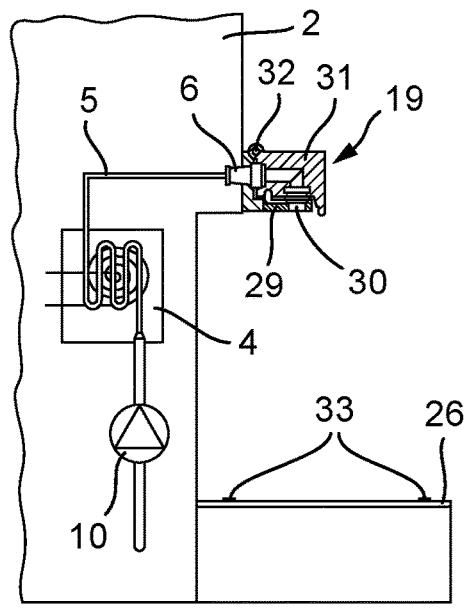
FIGS. 3A, 3B, 3C, 3D, 3E, 3F, 3G, 3H, 3I, 3J, 3K, and 3L schematically show the steps of a method of preparing a beverage by heating and frothing a beverage using the froth wand of FIGS. 1 and 2.
Figure 3B:
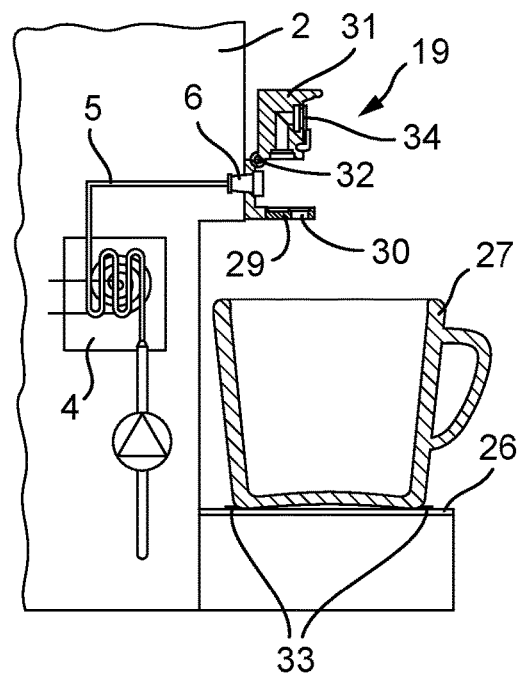
Figure 3C:
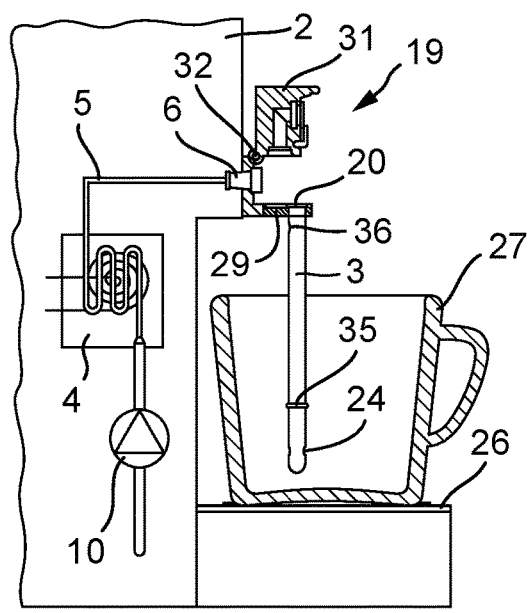
Figure 3D:
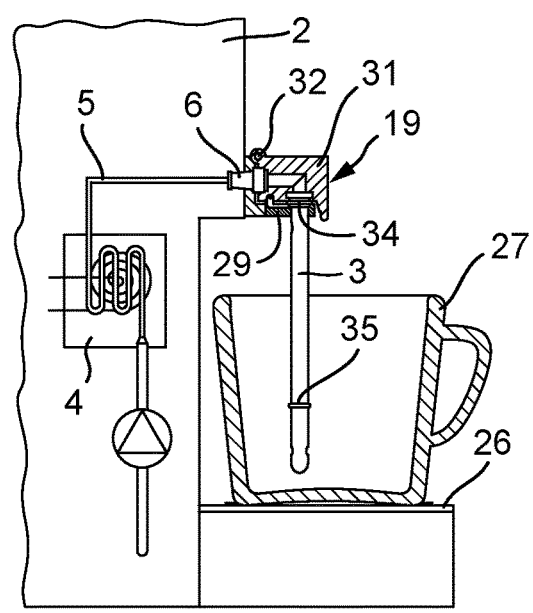
Figure 3E:
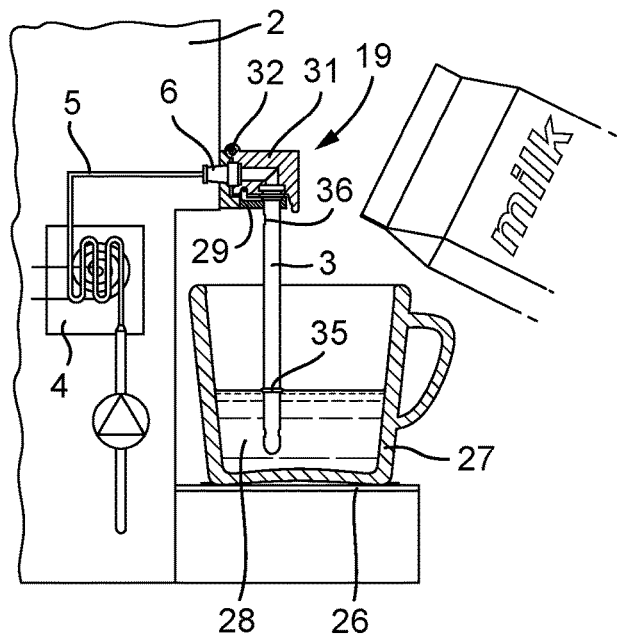

In FIG. 3A the start or rest position of the device 2 is shown in which the lid 31 is closed. To shorten the time period in which the beverage can be prepared the steamer or thermo block 4 is kept operative such that the water used for forming the steam is kept at an idle temperature of about 90° C. In the first step shown in FIG. 3B the lid 31 is opened by rotation around the rotation shaft 32 placing the froth wand holder 19 in the so-called froth wand insertion position, and a cup 27 is placed on the support 26. The system is arranged such that in this froth wand insertion position supply of steam is disabled. In order to provide a user with information where to place the cup 27 the support comprises position indicators 33, such as e.g. visual markings, indicating a central or off center position of the cup. A central position means that when a froth wand is held in the froth wand holder 19 the forth wand extends substantially centrally into the cup, in the off center position the froth wand will extend off center into the cup. In the second step shown in FIG. 3C a froth wand 3 is placed in the froth wand opening 30 of the froth wand holder 19 of the device 2 such that the froth wand 3 is held in the froth wand holder 19 in a substantially vertical position. In addition, in this so called operational position the steam nozzle 6 is in communication with the steam inlet 20 of the froth wand 3. In the third step shown in FIG. 3D the lid 31 is closed. The lid 31 comprises sealing means 34 which provides a seal with the upper edge of the froth wand 3 and in addition provides clamping of the froth wand 3. Please note that the system is arranged such that supplying steam is enabled only after the froth wand 3 is positioned in the froth wand holder 19 and more preferably when the lid 31 has been closed. In the fourth step shown in FIG. 3E the cup 27 is filled with a first beverage, such as milk 28, up to a fill indication mark 35 provided on the froth wand 3, such that the steam outlet 24 of the froth wand 3 extends into the milk 28.

Figure 3F:
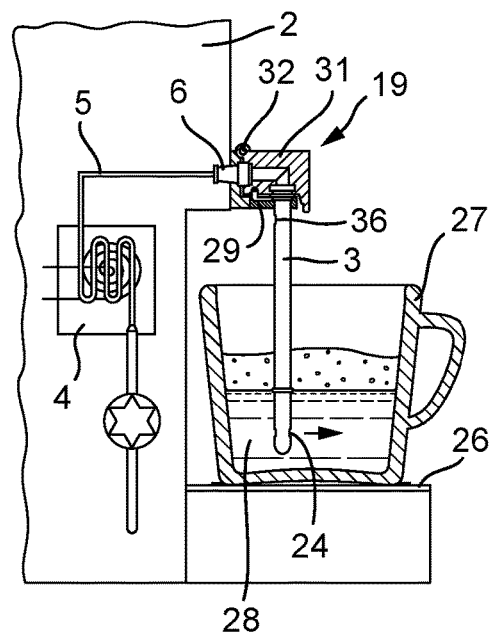
Figure 3G:
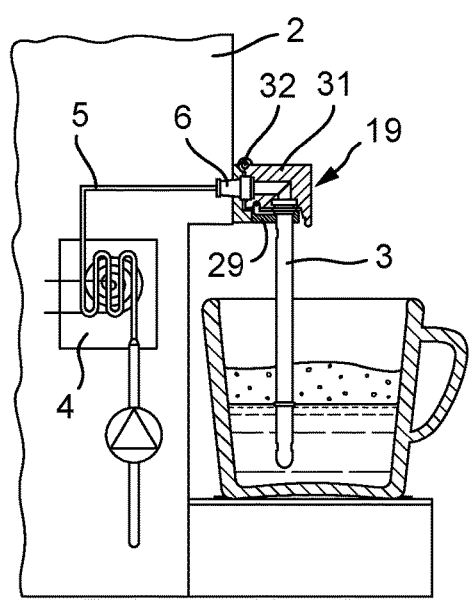
Figure 3H:
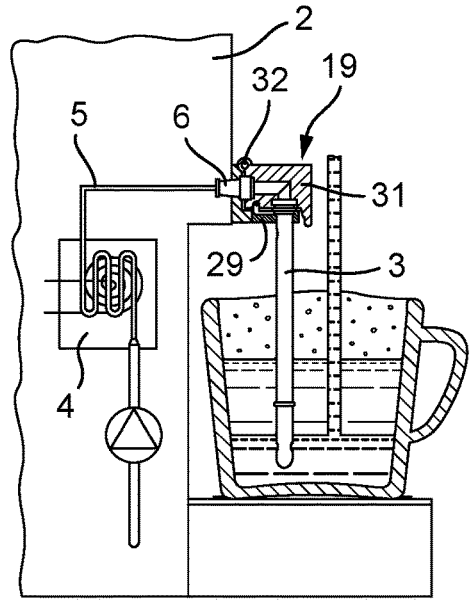
Figure 3I:
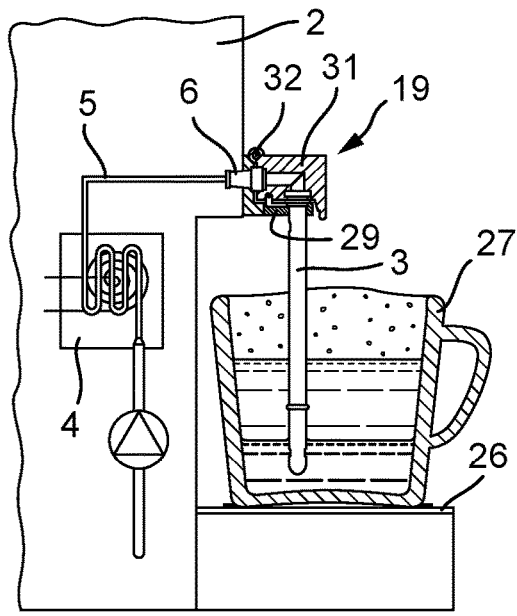
Figure 3J:
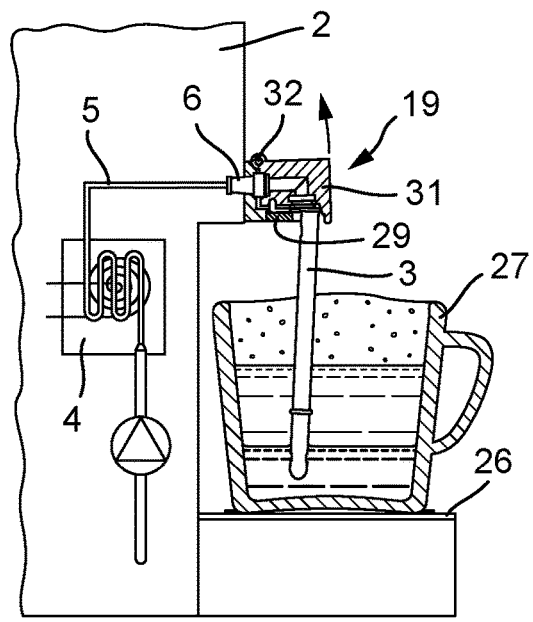

In the fifth step as shown in FIG. 3F the steamer 4 is activated and warms up the water further to produce steam which is then supplied to and through the froth wand 3 and into the milk 28 via the steam outlet 24. During steam supply cold water is fed from the cold water reservoir 7 (FIG. 1) to the steamer 4. During this supply of steam to and through the froth wand 3 air is sucked into the steam via the air slot 36. Supply of steam realizes the heating and frothing of the milk 28 and takes in this example place during a predetermined period of time to sufficiently heat and froth the milk 28. After the time period has elapsed the steamer 4 is deactivated in the sixth step as shown in FIG. 3G. Then in the seventh step (FIG. 3H) the liquid coffee dispenser 11 is activated and coffee as a second beverage different from the first beverage is added into the cup 27 until the dosing of coffee is completed (FIG. 3I). If desired by the user the steamer 4 can be activated again to heat and froth the coffee/milk mixture. Please note that in other examples the coffee can be dispensed into the cup and optionally heated and frothed before the milk is poured into the cup 27 and heated and frothed.

Figure 3K:
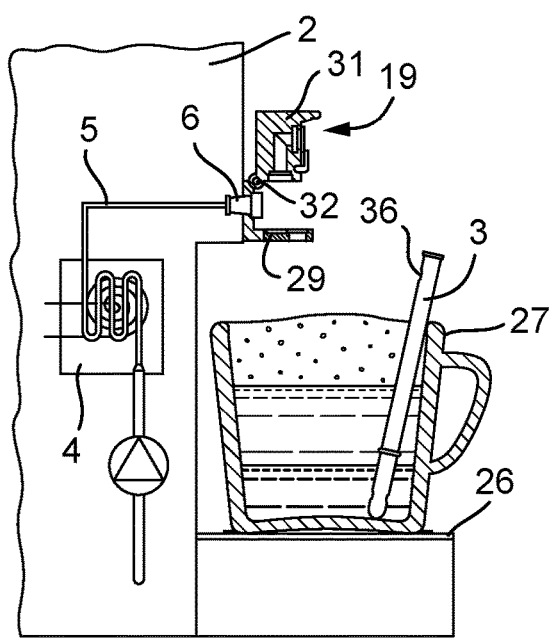
Figure 3L:
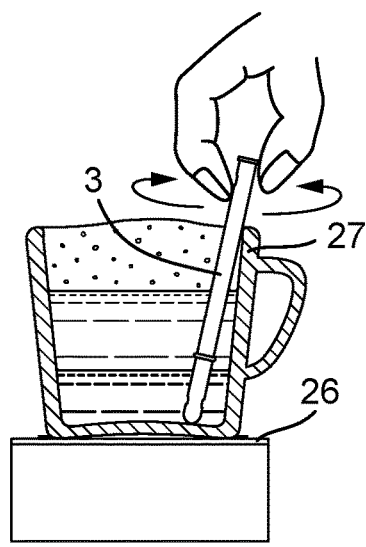

In the following step the lid 31 is opened (indicated by the arrow in FIG. 3J) and finally reaches the froth wand insertion position, thereby releasing the froth wand 3 from the froth wand holder 19, which in the shown example can be manually taken out of the froth wand holder 19 as shown in FIG. 3K. If desired the froth wand 3 can be used as stirrer (FIG. 3L) after the froth wand 3 has been released and the user can consume the prepared beverage and thereafter dispose of the froth wand 3.

In the example shown in FIG. 3 the froth wand 3 is disposed when it is used only once. Amongst others things dependent on the frequency the system is used to heat and froth a beverage the froth wand 3 can be used more than once but from a hygienic point of view number of times a froth wand is used should preferably be less than five.

Figure 4A:
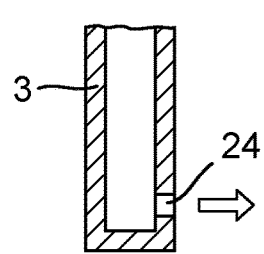
FIGS. 4A, 4B, 4C, 4D, 4E, 4F, and 4G schematically show the disposable froth wand according to FIGS. 1 to 3 with a radially extending steam outlet, with the froth wand shown in several positions in a cup.
Figure 4B:
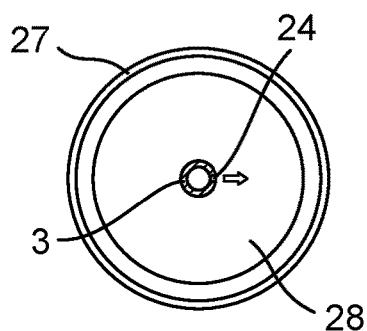
Figure 4C:
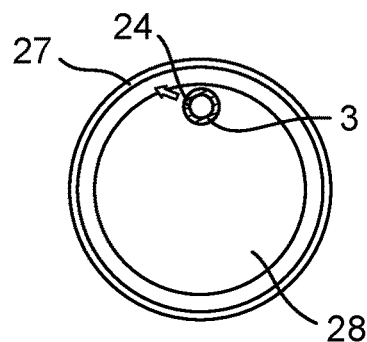
Figure 4D:
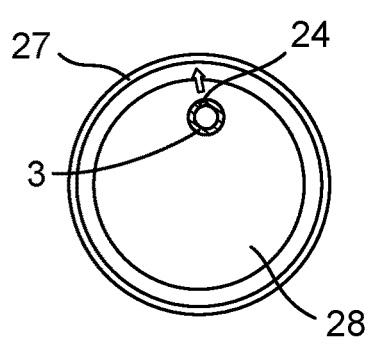
Figure 4E:
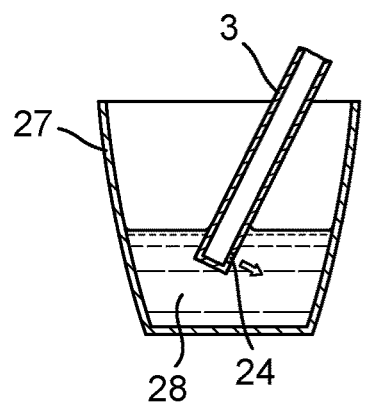
Figure 4F:
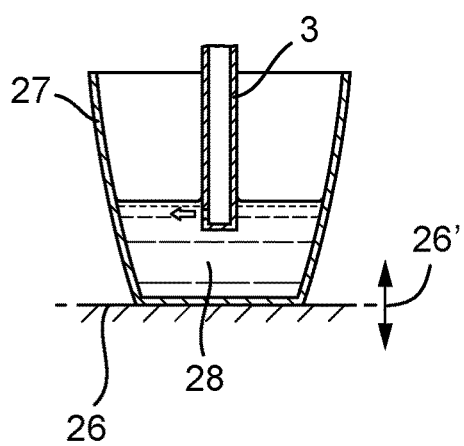
Figure 4G:
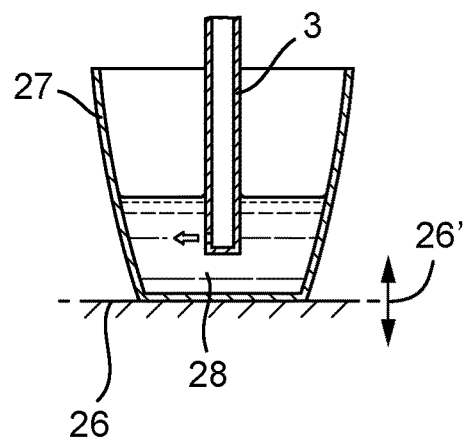

In FIGS. 4A-4G schematically the disposable froth wand 3 with the radially extending steam outlet 24 of FIG. 3 is shown, with the froth wand shown in several positions in which it can be positioned relative to the cup 27. The steam outlet 24 has a diameter of 1.5 mm, but can in other embodiments be between 1.0 mm and 2.0 mm. In FIG. 4B the central position of the froth wand 3 in the cup is indicated, while in FIGS. 4C and 4D the off center position of the froth wand 3 relative to the cup 27 is indicated. The radial extending slot 24 extends somewhat tangentially to the cup wall as indicated in FIG. 4C and is directed to the wall as indicated in FIG. 4D. In a not shown position the radial slot 24 can be directed to the center of the cup when the froth wand 3 is positioned off center. Please note that the user can to some extent influence frothing by adjusting the direction of the steam outlet and thereby adjust the frothing to his or her desires. In case the support 26 is adjustable in height (as indicated by the arrow 26') in FIGS. 4F and 4G the user can to some extent influence frothing by adjusting the height of the support and thus the depth in the milk the froth wand, in particular the steam outlet 24, is submerged, and thereby adjust the frothing to his or her desires. In addition the system 1 can be provided with several supports each having their own thickness to adjust the submersion depth of the froth wand 3 in the milk. In addition, the froth wand 3 can be tilted somewhat from the vertical position as shown in FIG. 4E to direct the steam downwards into the milk. Please note that it is also possible to realize this downwards direction of steam by tilting the cup.

Figure 5A:
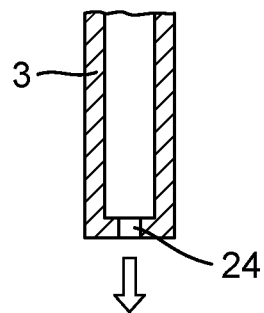
FIGS. 5A, 5B, 5C, 5D, 5E, and 5F schematically show another exemplary embodiment of a disposable froth wand according to the invention with a longitudinally extending steam outlet, with the froth wand shown in several positions in a cup.
Figure 5B:
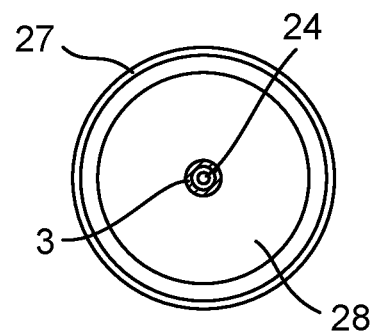
Figure 5C:
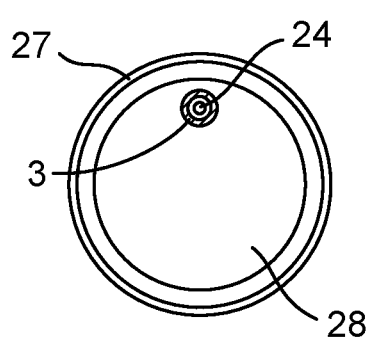
Figure 5D:
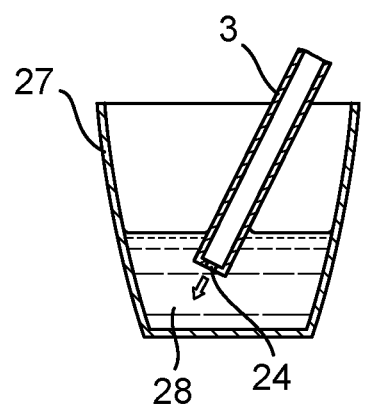
Figure 5E:
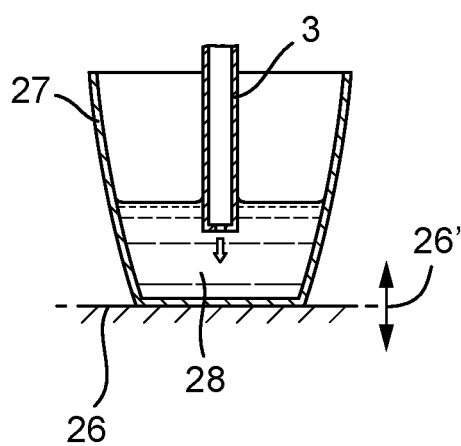
Figure 5F:
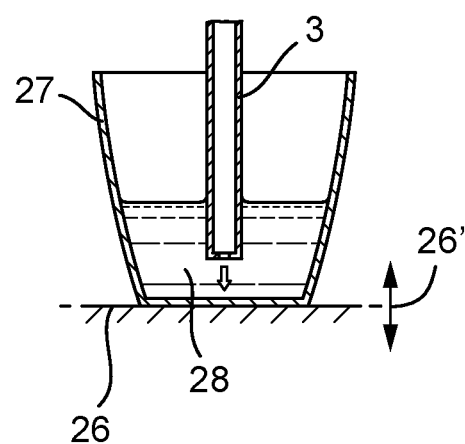

In FIGS. 5A-5F schematically another embodiment of a disposable froth wand 3 is shown comprising a longitudinally extending steam outlet 24, in this embodiment having a diameter of 1.5 mm, but the diameter can in other embodiments be between 1.0 mm and 2.0 mm, with the froth wand 3 shown in several positions in which it can be positioned relative to the cup 27. In FIG. 5B the central position of the froth wand 3 in the cup is indicated, while in FIG. 5C the off center position of the froth wand 3 relative to the cup 27 is indicated. In case the support 26 is adjustable in height (as indicated by the arrow 26') in FIGS. 5E and 5F the user can to some extent influence frothing by adjusting the height of the support and thus the depth in the milk the froth wand, in particular the steam outlet 24, is submerged, and thereby adjust the frothing to his or her desires. In addition the system 1 can be provided with several supports each having their own thickness to adjust the submersion depth of the froth wand 3 in the milk. In addition, the froth wand 3 can be tilted somewhat from the vertical position as shown in FIG. 5D to direct the steam downwards into the milk. Please note that it is also possible to realize this downwards direction of steam by tilting the cup.

In the embodiment shown in FIG. 3 air is introduced into the steam via the air inlet 36 of the froth wand 3 to provide a more consistent flow of steam which is dispensed into the milk by a radially extending steam outlet 24. In FIG. 5 an alternative froth wand 3 is indicated comprising a longitudinally extending steam outlet, and in FIG. 6A this froth wand 3 is shown with the air slot. In FIGS. 6A-6G and 10A-10C schematically several embodiments of a froth wand according to the invention are shown which can be used.

Figure 9A:
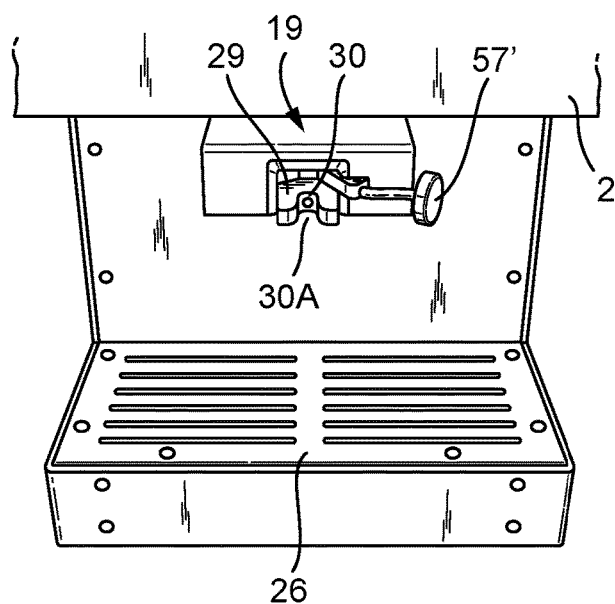
FIGS. 9A, 9B, 9C, 9D, and 9E schematically show another example of a system comprising a rotatable froth wand holder comprising a handle for manually displacing the froth wand holder and a froth wand ejector for ejecting a froth wand according to the invention.
Figure 9B:
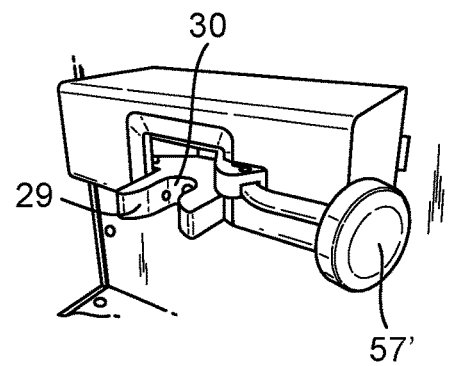

In the embodiment shown in FIG. 9B the froth wand 3 comprises a porous element 44 adjacent the steam outlet 24 and in the shown embodiment with a coaxial circulating sleeve 45 forming a circulation channel between the inner wall of the sleeve 45 and the outer wall of the froth wand 3 for realizing a circulation of steam and milk in the circulation channel as indicated by the arrows for more efficiently heating and frothing the beverage milk. Please note that since the circulating sleeve 45 is provided at the end of the froth wand 3 it can be easily submerged into to milk for obtaining a circulation during operation. The circulating sleeve 45 can of course also be used in embodiment without the porous element 44. Air is introduced in the steam by the air slot 36 in the froth wand 3, but can alternatively or additionally be introduced in the steam conduit of the device.

Figure 9C:
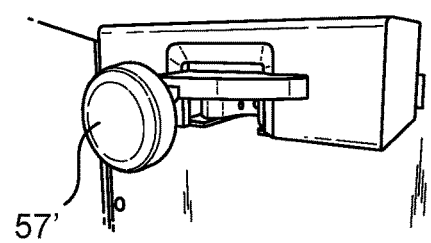

In the embodiment shown in FIG. 9C an air addition tube 46 is arranged on the tubular wall 21 near the steam outlet end 24 of the froth wand 3. The air addition tube 46 has an air intake opening 47 and an air outlet opening 48 separate from the steam outlet 24 but positioned adjacent to the steam outlet 24. In one embodiment of the invention during filling the cup with milk 28 care should be taken that the liquid level should not rise above the air intake opening 47 of the air addition tube 46. This air addition tube 46 can be used in place of the air slot 36 for introducing air into the milk 28.

In another embodiment however, this air addition tube 46 can be used additional to the air slot 36 (indicated in phantom in FIG. 9C) for either introducing additional air into the milk 28 or when the intake opening 47 is positioned below the level of milk or during use comes when the level of milk rises above the intake opening 47 to realize circulation of steam and milk in the circulation channel formed between the inner wall of the tube 46 and the outer wall of the froth wand 3 as indicated by the arrows for more efficiently heating and frothing the beverage milk.

Figure 6A:
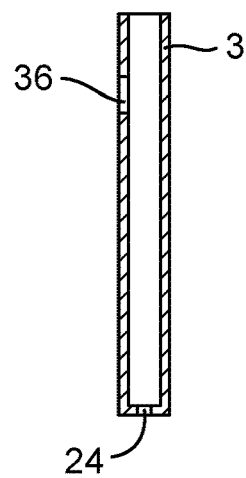
FIGS. 6A, 6B, 6C, 6D, 6E, 6F, and 6G schematically show several embodiments of a froth wand according to the invention.
Figure 6B:
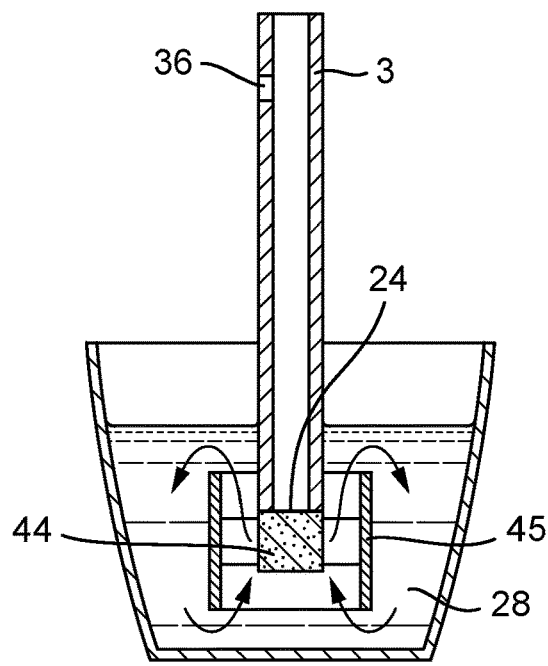
Figure 6C:
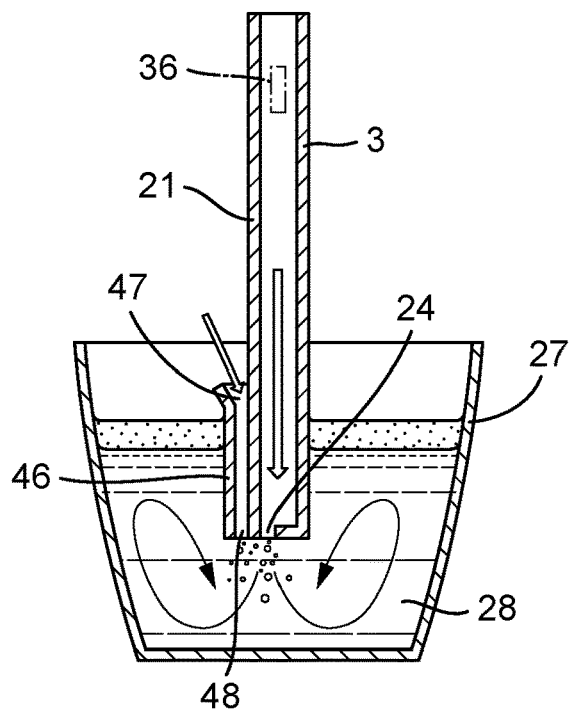
Figure 6D:
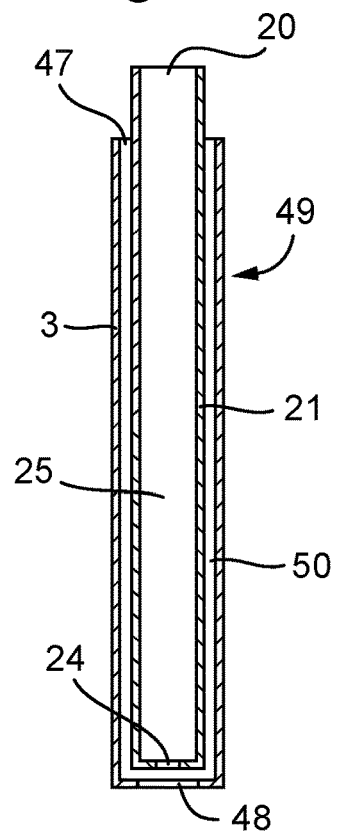

In the embodiment shown in FIG. 6D the froth wand 3 comprises a central steam channel 25 and a coaxial tube 49 surrounding the tubular wall 21 and forming therewith an ring shaped air channel 50 having an air intake opening 47 and an air outlet opening 48. Please note that the air intake opening 47 in this embodiment can optionally be connected to an air pump present in the device 2 for introducing air into the flow of steam.

Figure 6E:
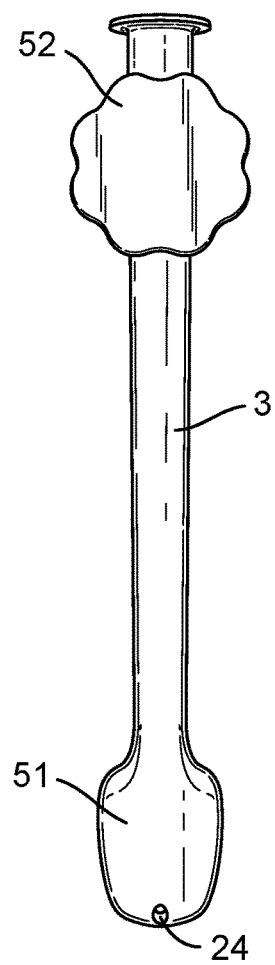
Figure 6F:
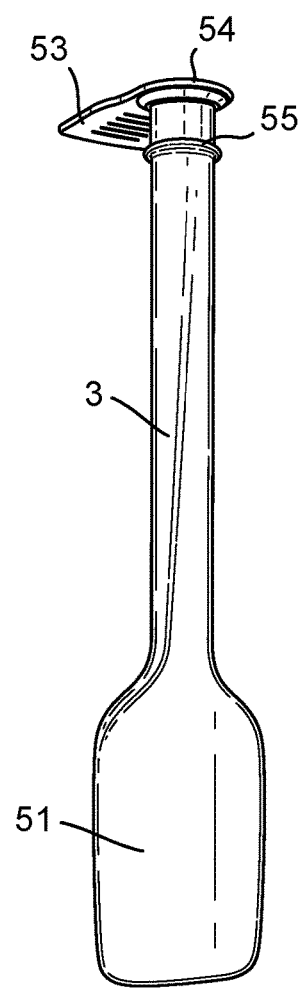
Figure 6G:
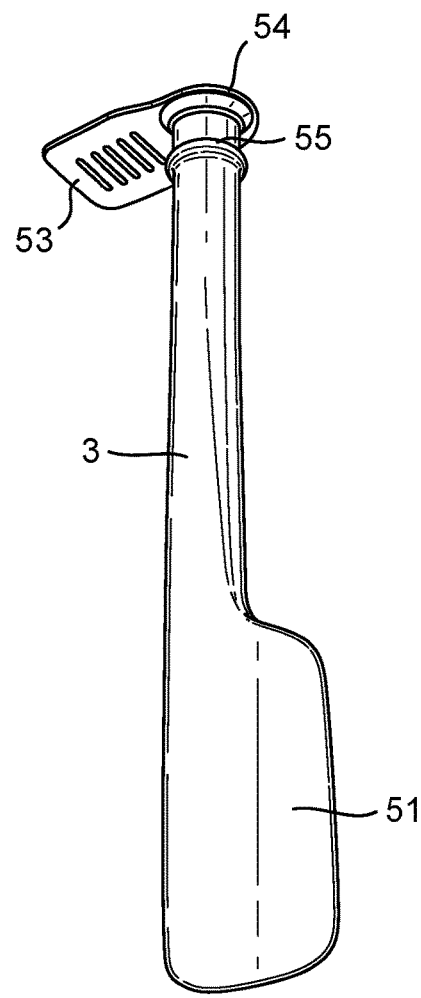

In FIGS. 6E-6G embodiments of the froth wand 3 are shown comprising a blade 51 at the steam outlet end 24 to improve stirring. The blade 51 can be shaped asymmetrical (FIG. 6G) or symmetrical (FIGS. 6E and 6F). The froth wand 3 shown in FIG. 6E further comprises a grip 52, for example a symmetrical grip, for gripping the froth wand 3 during stirring or a grip 53 (FIGS. 6F and 6G), for example an asymmetrical grip, to facilitate placing and removing the froth wand in and from the froth wand holder respectively. The embodiments of the froth wand 3 as shown in FIGS. 6F and 6G as well as those shown in FIGS. 10A and 10B further comprise an upper flange 53 at the steam inlet end by which the froth wand 3 can be supported in the seat 29 of the froth wand holder 19, wherein the upper flange 54 has a flat end face 54A for providing a sealing surface. Depending on the construction of the froth wand holder 19 in which the froth wand is to be held the froth wand 3 can further comprise a retention flange 55 (FIGS. 6F, 6G and 10A) spaced at a distance from the top flange 54.

Although the outside diameter of the embodiments of the froth wand as shown in FIGS. 6A-6D and 10A have a constant value over its complete length it will be clear that in other embodiments of a froth wand the outside diameter of the tubular wall can increase from the steam outlet end towards the steam inlet end. In the alternative embodiments shown in FIGS. 10B and 10C the tubular wall 21 comprises at least one portion 56, 56A, 56B extending from the steam inlet end in particular the upper flange 54 or free end of the froth wand, which portion has a decreasing outside diameter. This portion can be shaped such that it can be received without play in a mating froth wand opening 30 of the froth wand holder 19.

In FIGS. 7, 8, 9 and 11 examples of a system or device are shown having alternative froth wand holders with regard to the froth wand holder 19 shown in FIGS. 1 and 2 in which the froth wand holder 19 is movably mounted in the device 2 for heating and frothing a beverage for being displaced from the operational position to the froth wand insertion position, and vice versa.

Figure 7A:
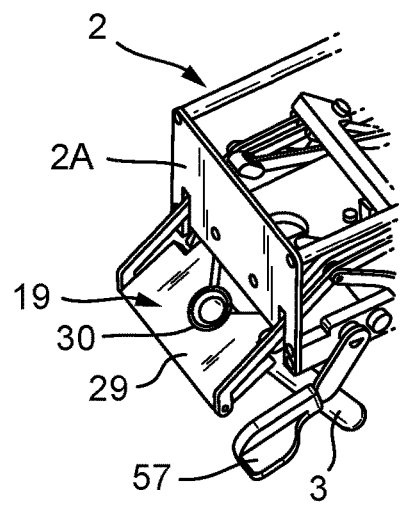
FIGS. 7A and 7B schematically show an example of a system comprising a froth wand holder positioned in the froth wand insertion position with a froth wand opening for receiving a froth wand according to the invention.
Figure 7B:
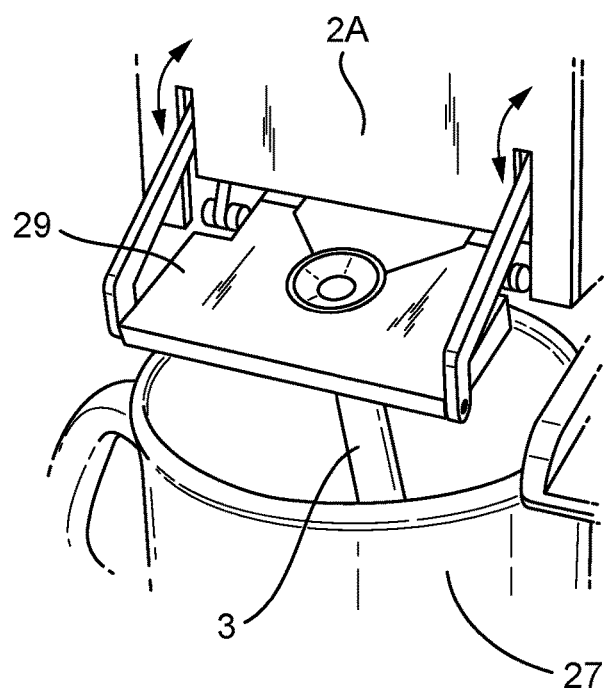

In FIGS. 7A and 7B a froth wand holder 19 is shown comprising a seat 19 with a froth wand opening 30. The froth wand holder 19 is positioned in the froth wand insertion position wherein the seat 29 with the froth wand opening 30 is situated outside the housing 2A of the device 2. After placement of the froth wand 3 in the froth wand opening 30 (FIG. 7B) the seat 29 can be pushed into the housing 2A. By means of a handle 57 the lid 31, which is now positioned within the housing, can be closed analogous to the example as shown in FIGS. 1-3.

Figure 8A:
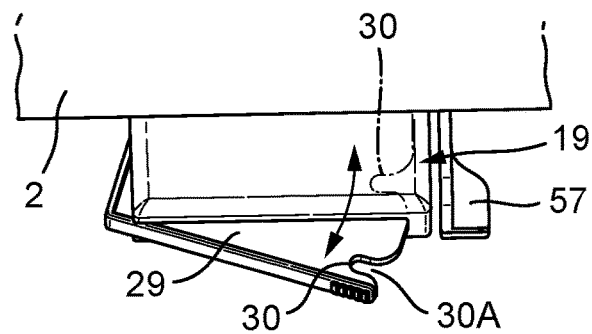
FIGS. 8A and 8B schematically show another example of a system comprising a froth wand holder positioned in the froth wand insertion position in which the horizontal seat of the froth wand holder comprises a radial slot opening into the froth wand opening for receiving a froth wand according to the invention.
Figure 8B:
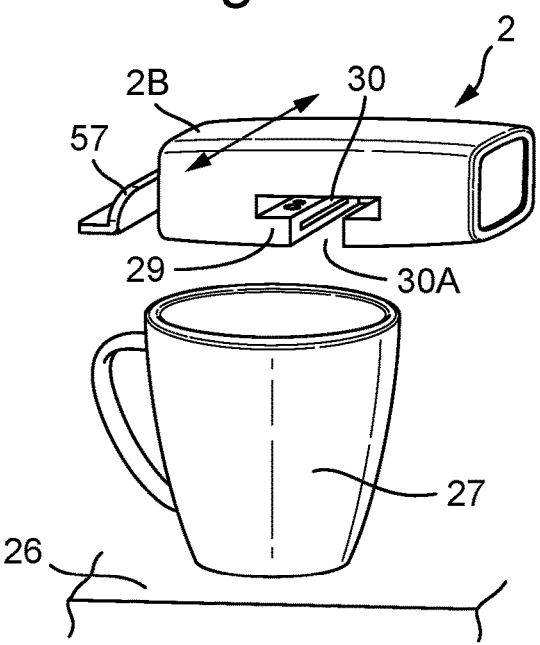

In the example of the froth wand holder 19 shown in FIG. 8A in the froth wand insertion position the seat 29 comprises a radial slot 30A opening into the froth wand opening 30 so that a froth wand can be placed in the froth wand opening by displacing it from the side of the seat through the radial slot 30A. In this example the froth wand holder in particular the seat 29 is rotatable from the froth wand insertion position to an operational position in which the froth wand opening 30 (indicated by broken lines) is not accessible from outside the device. Also in this example the froth wand holder can comprise a handle 57 for manually displacing the lid of the froth wand holder. In the example shown in FIG. 8B a froth wand can be inserted into the radial slot 30A from the front of the device 2. In this example the lid 31 can be housed in a chamber portion 2B which is either fixed relative to the housing of the device or can be movable as indicated by the arrow. Also in this example the froth wand holder can comprise a handle 57 for manually displacing the lid of the froth wand holder.

In the example as shown in FIGS. 1 to 3 the froth wand is clamped by the seal 34 as the lid 31 is closed, in this manner sealing and clamping are performed by the same component. It will however be clear for a person skilled in the art that the froth wand holder can comprise any other known clamping mechanism for clamping the froth wand separate from sealing the froth wand. An exemplary example of such a clamping mechanism 58 is disclosed in FIG. 11B. The clamping mechanism 58 comprises a movable engagement part 59, arranged for being displaced from an idle position at least partly protruding into the froth wand opening 30 (indicated by the solid line) to an activating position 59' outside the froth wand opening indicated by broken lines. The clamping mechanism 58 further comprises two movable clamping arms or parts 60, 60A coupled to said displaceable engagement part 59, 59' and are in the shown example coupled together via a rotation shaft 61. The movable clamping part 59 is coupled to the arms 60, 60A such that the arms 60, 60A of the clamping part is positioned into a releasing position RP for releasing or receiving the froth wand when the engagement part is in the idle position and such that the clamping part is positioned in a clamping position CP for clamping the froth wand when the engagement part is in the activating position i.e. when the engagement part 59A is engaged by the froth wand and pushed inward by inserting the froth wand into the froth wand opening. In stead of using the froth wand itself as operator for activating the clamping mechanism, the device 2 can comprise a separate clamping activator, which positions the clamping mechanism in either a releasing position for receiving or releasing the froth wand or a clamping position for clamping the froth wand. Such a clamping activator preferably is formed by the handle 57 or the lid 31 which is used to move the froth wand holder from the froth wand insertion position to the operational position and can be used for simultaneously and automatically displacing the clamping mechanism from the releasing position into the clamping position when it moves the froth wand holder from the froth wand insertion position to the operational position. In particular the clamping mechanism is arranged for clamping the froth wand at least in the operational position.

In the exemplary example of the froth wand holder 19 as shown in FIGS. 9A-9E the froth wand holder 19 also comprises a seat 29 with a radial slot 30A opening into the froth wand opening 30 so that a froth wand can be placed in the froth wand opening by displacing it from the front of the seat through the radial slot 30A. In this example the froth wand holder in particular the seat 29 is rotatable from the froth wand insertion position (shown in FIGS. 9A and 9B) to an operational position (shown in FIG. 9C) in which the froth wand opening 30 is not accessible from outside the device. The froth wand holder 19 comprises a handle 57' for manually rotating the seat 29 of the froth wand holder 19. In this example the froth wand holder 19 comprises a froth wand ejector 62 for ejecting the froth wand 3 out of the froth wand holder 19. In the shown example the froth wand ejector 62 is arranged for ejection the froth wand 3 through the radial slot 30A as will be explained below.

Figure 9D:
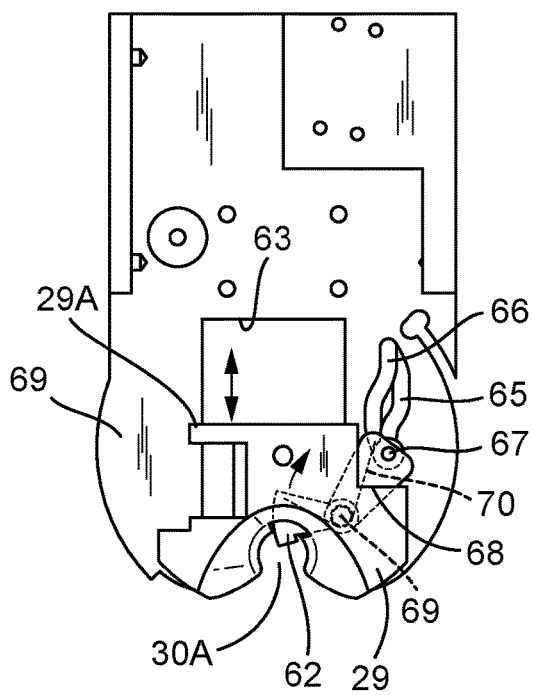
Figure 9E:
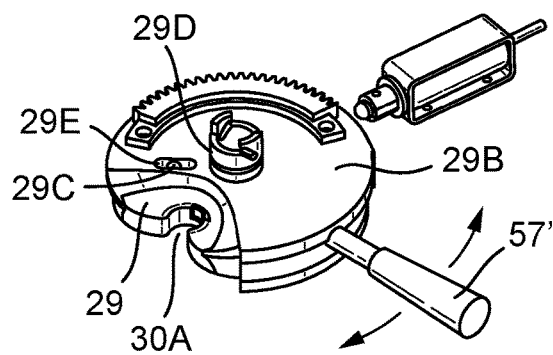
Figure 10A:
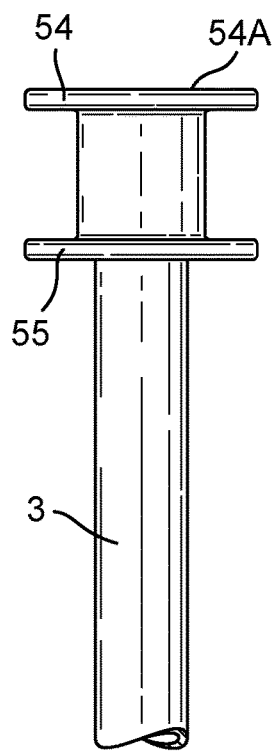
FIGS. 10A, 10B, and 10C schematically show several embodiments of a froth wand according to the invention with different configurations at the steam inlet end.
Figure 10B:
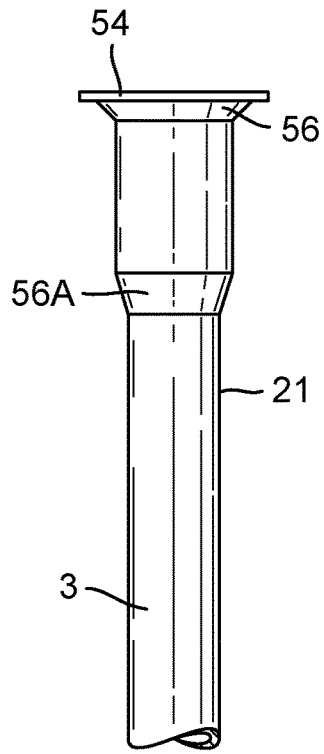
Figure 10C:
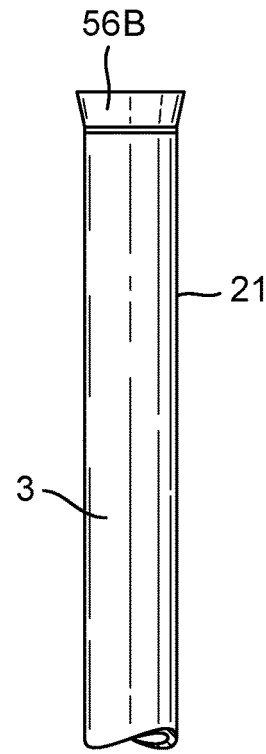

The seat 29 of the froth wand holder is mounted displaceable from the froth wand insertion position shown in FIG. 9D in which the stop end 29A of the seat 29 is spaced from a stop surface 63 of a seat guide 64 of the froth wand holder up to the operational position in which the stop end 29A abuts the stop surface 63. This displacement is effected by rotation of an upper seat part 29B (FIG. 9E) which is rotatably mounted to the seat 29 via a centre boss 29D. In the upper seat part 29B a slot 29E is provided in which a slider 29C fixed to the seat 29 is received. Upon rotation of the upper seat part 29B by operating on the handle 57' the side edges of the slot 29D engage with the slider 29C as a result of which the seat 29 is displaced as indicated by the arrow in FIG. 9D. The seat guide 64 of the froth wand holder 19 comprises two cam tracks 65, 66 in which a boss 67 is received and can be displaced during movement of the seat 29. The boss 67 is connected to a rotation axis 69 via an arm 68 and the froth wand ejector 62 (shaped as an arm) is also rotatably connected to the rotation axis 69 and is loaded by a spring 70. In this manner the spring 70 is loaded when the froth wand holder is displaced from the froth wand insertion position into the operating position in which the boss 67 is guided in the track 65 and is released for actuating the ejector arm 62 to eject the froth wand from the radial slot 30A when the froth wand holder is displaced from the operating position into the froth wand insertion position in which the boss 67 is guided in the track 66. In this manner the froth wand is ejected automatically. Please note that the system can be arranged such that the seat 29 can only be displaced from the operational position to the froth wand insertion/releasing position after steam has been supplied through the froth wand or upon a specific instruction thereto, e.g. given by pressing a respective button suited therefore in order to improve safety. Thus using such a device leads to a method of preparing a beverage in which the step of positioning a froth wand in the froth wand holder of the device for heating and frothing a beverage is performed when the froth wand holder is positioned in the froth wand insertion position, the step of displacing the froth wand holder from the froth wand insertion position to the operational position takes place by rotating the seat of the froth wand holder by application of a handle, the step of displacing the froth wand holder from the operational position to the froth wand insertion position takes place only after steam is supplied to and through the froth wand, where after the froth wand is released automatically from the froth wand holder.

Figure 11A:
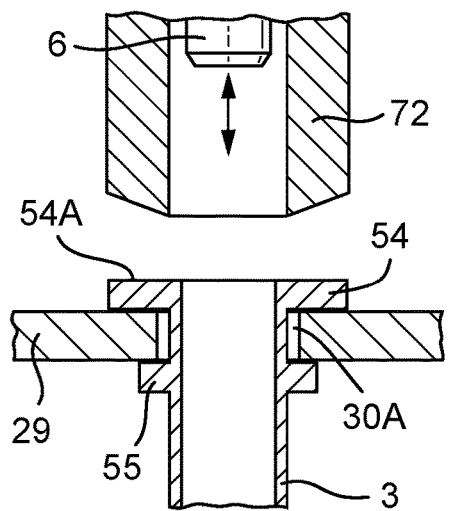
FIGS. 11A, 11B, 11C, 11C, and 11D schematically show a further example of a system in which the froth wand holder comprises froth wand clamping means and in which the steam nozzle is configured to be introduced and received in the steam channel of a froth wand according to the invention.
Figure 11B:
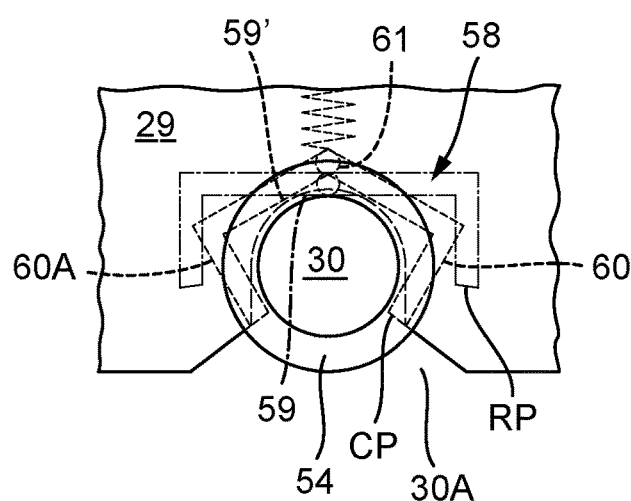
Figure 11C:
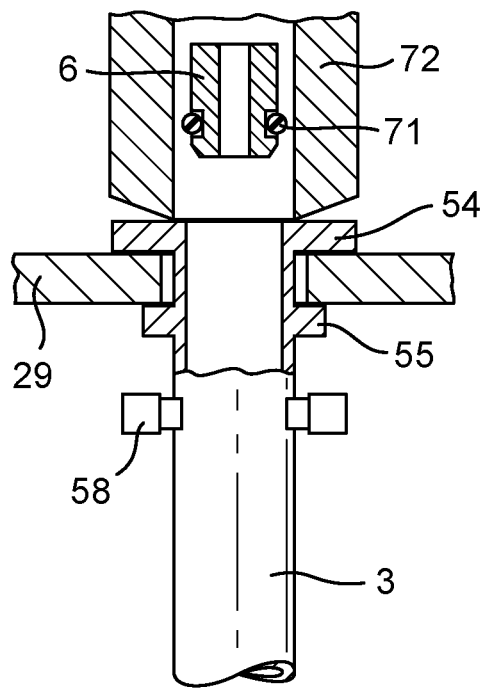
Figure 11D:
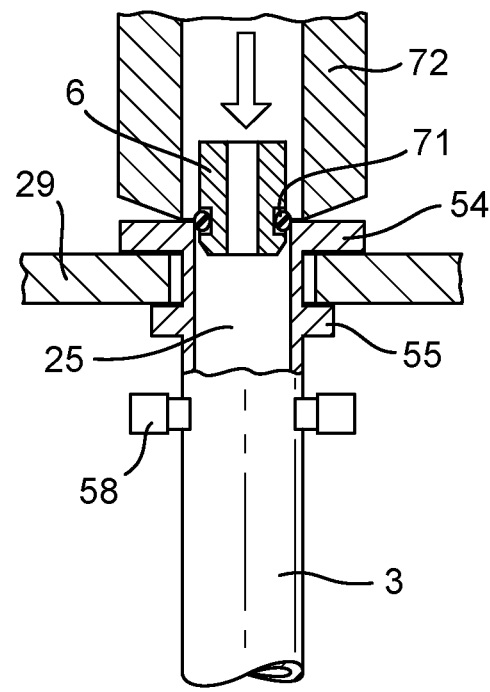

In the example shown in FIGS. 1-3 the lid 31 comprises a conduit 31A which ensures communication of the nozzle 6 (in the shown example extending horizontally) and the steam channel of the froth wand in operational position. However, it will be clear to a person skilled in the art that the nozzle 6 can e.g. also be oriented vertically. Such an example is for example disclosed in FIGS. 11A-11D. In the example shown in these FIGS. 11A-11D the steam nozzle 6 is movably mounted in the device 2 for heating and frothing a beverage. As follows from FIG. 11D the steam nozzle 44 is further dimensioned so that it can be received in the steam channel 25 of the froth wand 3. The steam nozzle 6 comprises a seal 71 for sealing against an inner surface of the tubular wall enclosing the steam channel. As shown in the FIG. 11 the steam nozzle 44 is movable arranged within a guide tube 72 which is also movably mounted. This guide tube 72 (part of the lid or as replacement of the lid) is first lowered to seal against the upper flange 54 of the froth wand and to provide clamping in addition to the clamping realized by the clamping means 58 (FIG. 11C). Thereafter the steam nozzle 6 is lowered into the steam channel of the froth wand as indicated in FIG. 11D, where after steam can be supplied to and through the steam nozzle and steam channel.

Figure 12:
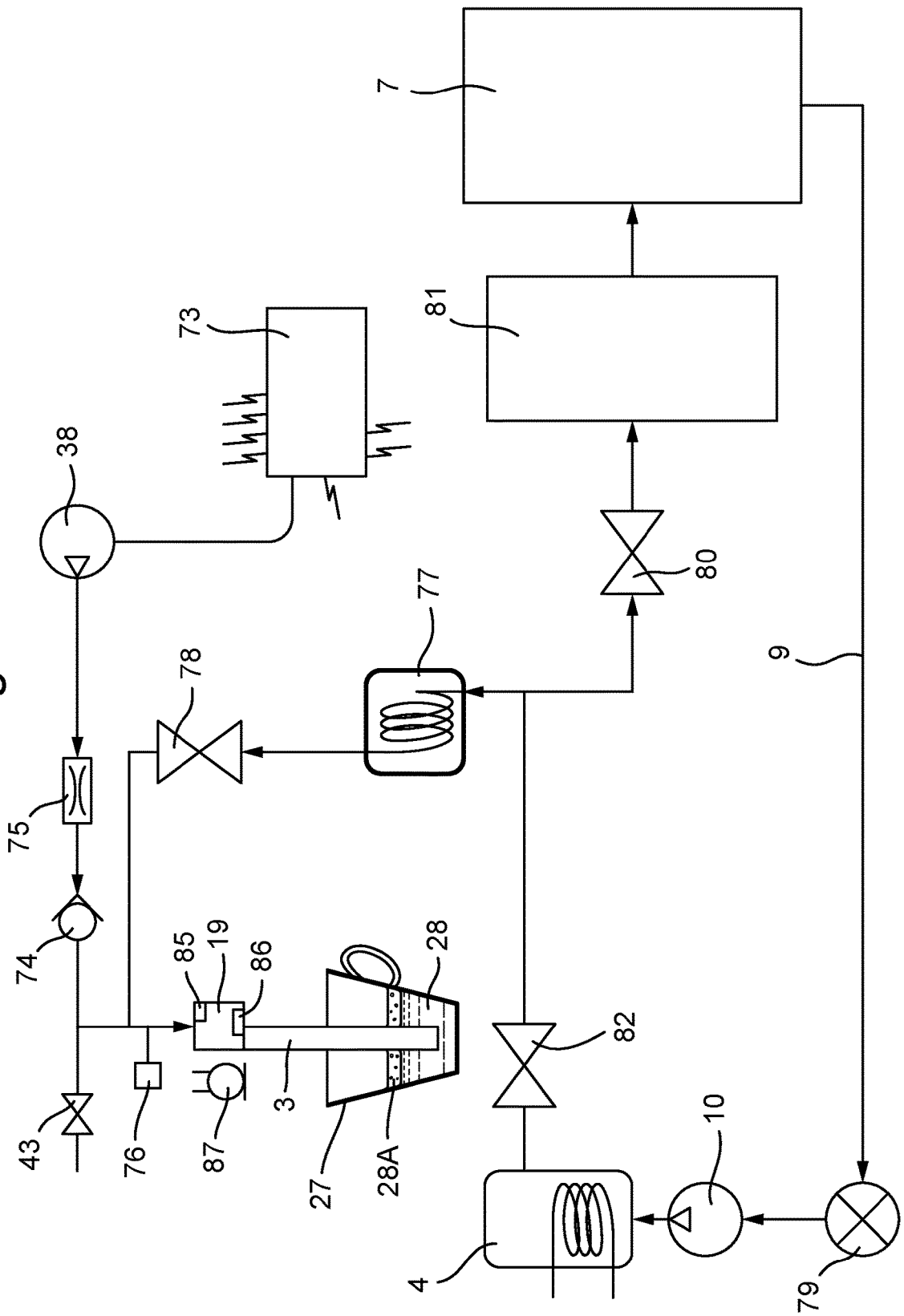
FIG. 12 schematically shows an example of the schematics of a system in which the interconnection between constituting components is shown schematically which can be used for heating a frothing a beverage with a froth wand according to the invention.

In FIG. 12 schematically a first example of a schedule of an example of a system is shown in which the interconnection between constituting components is shown schematically. The device of the system for heating and frothing a beverage comprises a controller 73 which operationally connected to the steamer 4 for controlling the operation of the steamer. In addition the controller 73 is operationally connected to the air pump for controlling the operation of the air pump and operationally connected to the cold water pump 10 for controlling the operation of the cold water pump and operationally connected to the valve 43 for positioning the valve in a respective connecting position. In case an electromagnetically controlled froth wand ejector is used the controller 73 is also operationally connected to the froth wand ejector for either activating or deactivating the froth wand ejector. The system further comprises the following shelf components: a non-return valve 74, an air restrictor 75, a duck-bill valve 76, an additional thermo block 77 and a steam delivery valve 78, a water flow meter 79, a steam dump valve 80, a condenser 81 and a steam charge valve 82. In the second schedule example shown in FIG. 13 additionally a steam pump 83 and a pressure regulator 84 are enclosed in the depicted manner.

Figure 13:
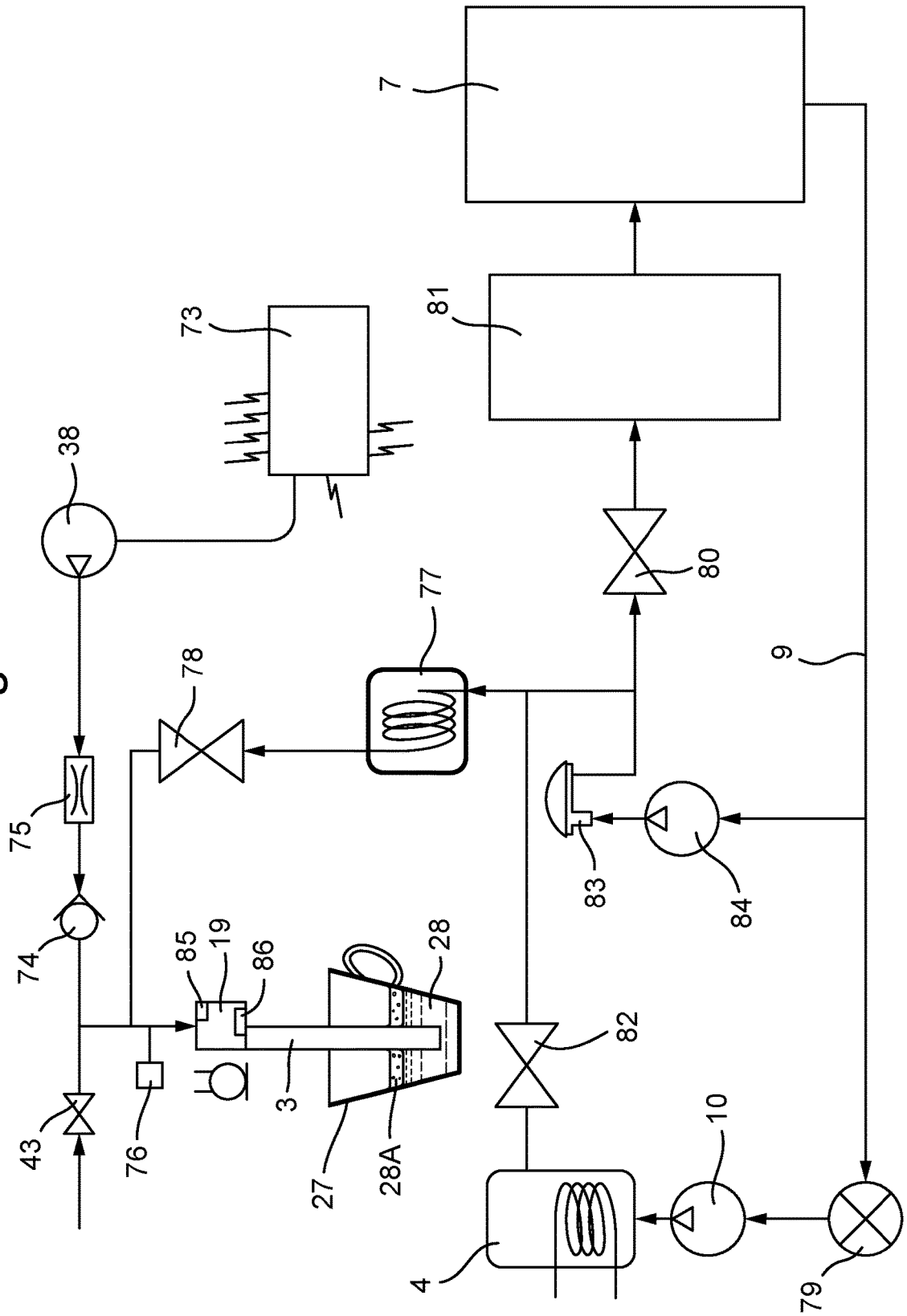
FIG. 13 schematically shows a further example of the schematics of a system in which the interconnection between constituting components is shown schematically which can be used for heating a frothing a beverage with a froth wand according to the invention.

Both systems shown in FIGS. 12 and 13 further comprise a froth wand holder detector 85 for detecting whether the froth wand holder 19 is positioned in the operating position. This froth wand holder detector 85 is operationally connected to the controller 73 for supplying a signal to the controller 73 indicative for whether the froth wand holder 19 is positioned in the operating position or not. The controller 73 is then arranged for deactivating the (electromagnetically actuatable) froth wand ejector when the signal received from the froth wand holder detector 85 indicates that the froth wand holder 19 is in the operating position. The froth wand holder detector 85 is further arranged for detecting whether the froth wand holder 19 is positioned in the froth wand insertion position and can supply a signal to the controller 73 indicative for whether the froth wand holder 19 is positioned in the froth wand insertion operating position or not. The controller 73 is then arranged for activating the froth wand ejector when the signal received from the froth wand holder detector 85 indicates that the froth wand holder is in the froth wand insertion position and the controller 73 has deactivated the steamer 4 within a predetermined time period before receiving said signal from the froth wand holder detector 85.

The controller 73 is arranged for automatically deactivating a component to which it is operationally connected when the signal from the froth wand holder detector 85 indicates that the froth wand holder 19 is in the froth wand insertion position and/or arranged for activating a component to which it is operationally connected only when the signal from the froth wand holder detector 85 indicates that the froth wand holder is in the operating position.

In the schedules of the systems shown in FIGS. 12 and 13 the device further includes a froth wand presence detector 86 for detecting whether a froth wand 3 is held in the froth wand holder 19. The froth wand presence detector 86 is operationally connected to the controller 73 for supplying thereto a froth wand presence signal indicative of whether or not a froth wand 3 is held in the froth wand holder 19. The controller 73 is then arranged for controlling the component which is operationally connected to it at least in dependence of the froth wand presence signal.

Figure 14:
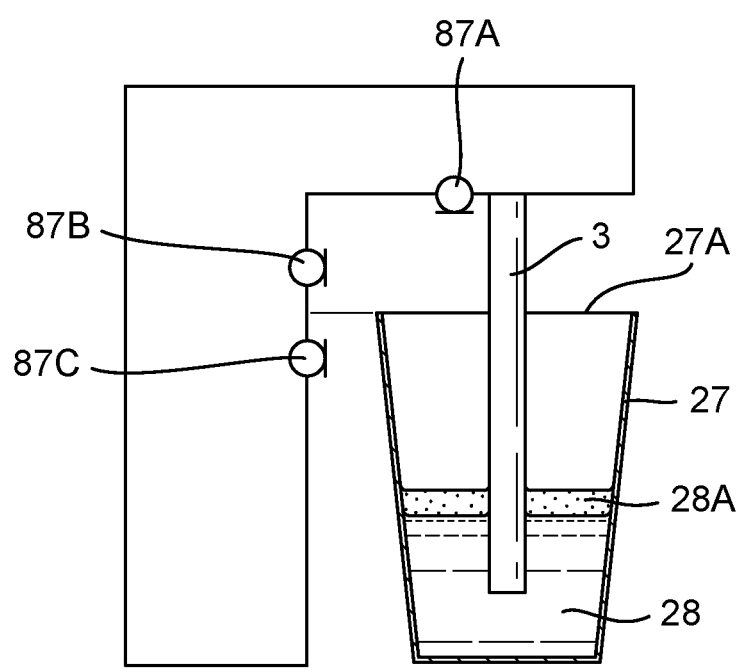
FIG. 14 schematically shows the possible positions of a microphone as temperature sensor for measuring the temperature of froth heated and frothed by a froth wand according to the invention.

In the schedules of the systems shown in FIGS. 12 and 13 the system in particular the device further includes a froth temperature sensor 87 for sensing a temperature of froth 28A in the cup 27. The temperature sensor 87 is operationally connected to the controller 73 for supplying thereto a signal indicative for the measured froth temperature. The froth temperature sensor comprises at least one microphone (see FIG. 14) which can be positioned above (87A) the cup 27, beside (87B) the cup 27 above the upper edge 27A of the cup 27 or beside (87C) the cup below the upper edge 27A of the cup 27. Measuring the temperature of the froth 28A then includes recording sound from the froth 28A and the step of deriving the temperature from the recorded sound by means of a suitable algorithm stored in the controller 73. Depending on the measured temperature the controller 73 can then decide whether or not to deactivate the steamer 4. The controller 73 therefore controls the method of heating and frothing and preparing a beverage based on information gathered by the respective sensors 79, 85, 86 and 87.

In the following embodiments of a froth wand according to the invention are shown in which the froth wand comprises a container for containing a beverage base material. By way of example the invention will be described with roasted ground coffee (RGC) as beverage base material. However, the invention is not restricted to roasted ground coffee and the container of the froth wand according to the invention can contain other beverage base materials or food substances including but not limited to tea, herbs, soup, liquid beverage or food concentrate, powdered beverage or food concentrate, syrups, mixes (powdered or liquid concentrate), juices, chocolate drinks. In addition, water will be described as being the extracting medium, but it will be clear that in dependence on the base material another extracting medium, such as e.g. milk, can be used.

Figure 15E:
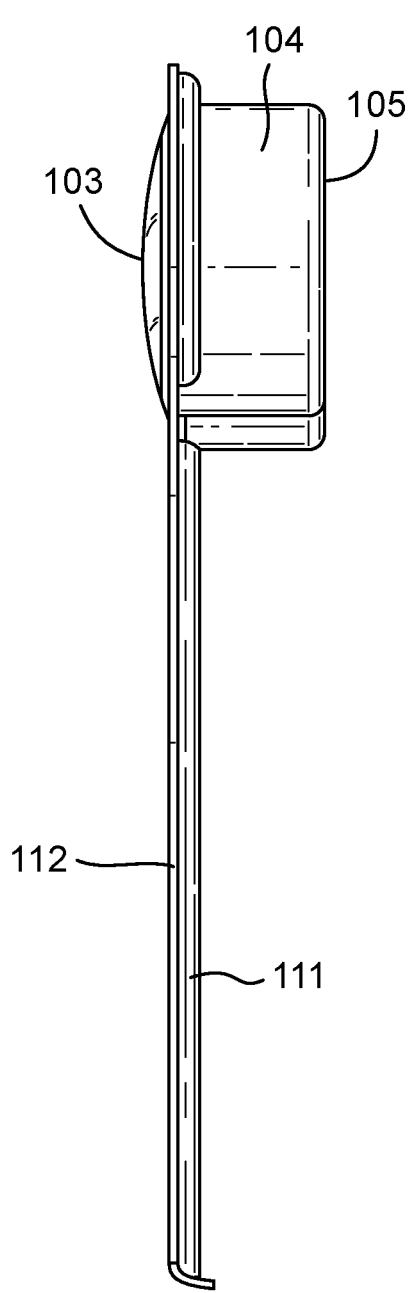
FIG. 15E shows the first embodiment of the froth wand comprising a container according to FIG. 1C from the side.

FIGS. 15A and 15B schematically show a first embodiment of a froth wand 101 for containing RGC. The froth wand 101 includes a base body 102 and a cover 103 (FIG. 15C). The base body 102 is molded from as PLA and comprises an RGC chamber 104 defined by a chamber bottom 105 and a chamber wall 106 at the perimeter of the chamber bottom 105. Although in the shown embodiment the wall has a circular circumference, in other embodiments the wall may have other shapes, such as of a polygon or an oval. The chamber 104 of the base body is open at the side opposite the chamber bottom 105 for receiving an amount of RGC preferably equivalent to an amount for a single serving of coffee.

The chamber wall 106 has a sealing surface 107 at its free end opposite the chamber bottom 105, such that the cover 103 can be attached to the sealing surface 107 of the chamber wall 106 for closing the RGC chamber 104.

The froth wand 101 further comprises an intake opening 108 for taking in water into the RGC chamber 104, which intake opening is formed by a pierceable water intake portion 108 provided in the chamber bottom 105. The froth wand 101 in addition comprises a dispensing opening 109 for dispensing a coffee beverage from the RGC chamber 104 provided in the sealing surface 107 of the chamber wall 106.

The tubular wall of the froth wand forms an elongated handle 110 extending in a direction having a radial component outward from the beverage base material chamber 104. The elongated handle 110 is integral with the base body 102 and comprises a handle bottom 111 and a handle sealing flange 112. The handle 110 is provided with an outlet channel 113 extending from an upstream channel inlet 114 communicating with the dispensing opening 109 to a downstream channel outlet 115 provided at the free end of the handle 110. The handle sealing flange 112 is flush with the sealing surface 107 of the chamber wall 106 so that the cover 103 can also be attached to the sealing flange 112 of the handle 110 for closing the outlet channel 113 in a direction opposite the handle bottom 111. As can be seen in FIG. 15D the sealing flange 112 of the handle 110 surrounds the channel outlet 113, so that when the cover 103 is attached to the sealing flange 112 the channel outlet 113 is completely closed even at the location of the channel outlet 115 (see FIG. 15C). To open the channel outlet 115 by the pressure created by the beverage dispensed through the outlet channel 113 the cover 103 is weakened at the location 116 of the channel outlet.

Figure 15F:
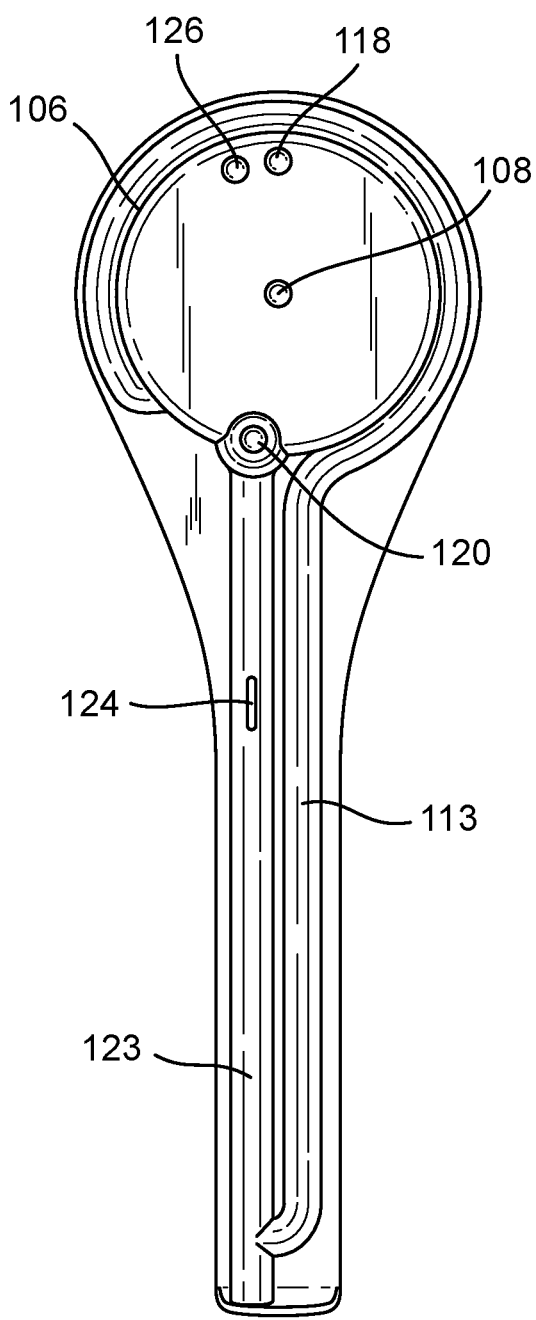
FIG. 15F shows the first embodiment of the froth wand comprising a container according to FIG. 1C from below.

In the embodiment shown in FIG. 15 the height of the chamber wall 106 is about five times the height of the elongated handle 110. This ensures easy handling while enabling a sufficient amount of RGC to be received within the chamber 104 without a superfluous use of material. It shall be clear that in other embodiments the height ratio can be at least four or at least six depending on amongst other things the amount of RGC to be contained within the chamber 104.

The upstream channel inlet 114 communicates with the dispensing opening 109 via a peripheral dispensing channel 117 provided in the sealing surface 107 of the chamber wall 106 to obtain a compact froth wand 101. The chamber bottom 105 is further provided with a pierceable extraction medium bypass intake portion 118 which via an extraction medium bypass pipe 119 in the chamber wall 106 discharging in the peripheral dispensing channel 117 leads to the upstream channel inlet 114 of the outlet channel 113 of the handle 110. By using an extracting medium bypass 118, 119 a more consistent output of beverage from the froth wand 101 can be obtained and furthermore the strength of the prepared beverage can be adjusted via said extracting medium bypass.

In the embodiment of a froth wand 101 shown in FIGS. 15A-F the chamber bottom 105 is further provided with a pierceable steam inlet portion 120 which via a steam inlet pipe 121 in the chamber wall 106 leads to an upstream steam channel inlet 122 of a steam outlet channel 23 which is provided in the handle 110. The steam outlet channel 123 ends in a downstream steam channel outlet provided at the free end of the handle 110, which in the shown embodiment coincides with the outlet 115. This is realized in that the outlet channel 113 discharges into the steam channel 123 at a location 125 at a distance from the free end of the handle 110. In other embodiments of the froth wand (not-shown) the outlet of the steam channel 123 and the outlet of the outlet channel 113 can be separate from each other.

As can be seen in FIG. 15C the cover 103 also closes off the steam channel 123 in a direction opposite the handle bottom 111. In this manner the froth wand 101 itself can be used to supply steam, e.g. into fresh milk poured into a cup to prepare milk foam. An air inlet slot 124 is provided in the handle bottom 111 opening into the steam channel 123. This air inlet slot 124 allows air to be sucked into the steam channel 123 when steam is being passed therethrough in order to provide a more consistent flow of steam through the steam channel 123.

A pierceable aroma vent portion 126 is provided in the chamber bottom 104 for after being pierced letting aroma escape from the froth wand 101 during extraction of the beverage. The cover 103 is at least partially transparent at a location 127 opposite the chamber bottom so that e.g. the extraction process can be followed by a user.

The handle 110 is provided with a marking 128 for indicating a minimum level of milk to be combined with the beverage and can be surrounded with a (not shown) manually removable paper sleeve which is to be removed before use. The outer surface of the chamber bottom 105 of the froth wand 101 can be provided with a manually removable sealing membrane, which is to be removed before use.

Froth wand variants that do not require the use of steam for e.g. foaming milk or in case the user does not wish to use steam, the base body 102 can be provided with a tear line 129 between the beverage base material chamber 104 and the handle 110 so that the handle 110 can be manually removed.

Figure 15G:
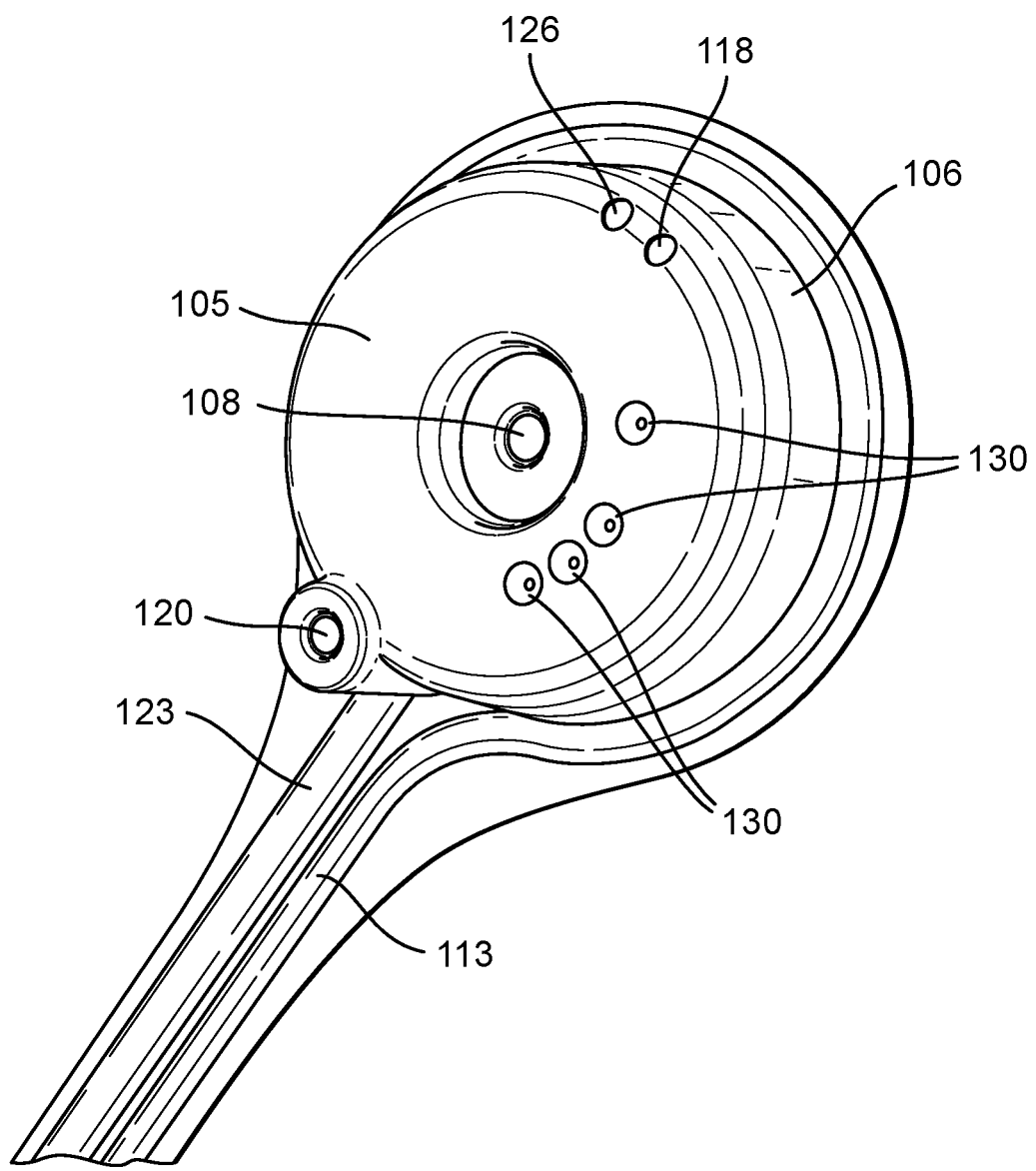
FIG. 15G shows a second embodiment of a froth wand comprising a container according to the invention comprising an identifier.

In FIG. 15G a second embodiment of a froth wand 101 according to the invention is partly shown. The froth wand 101 according to this second embodiment differs from the one shown in FIGS. 15A-15F in that it comprises an identifier 130 in the form of depressions in the chamber bottom 104, which, when read by a reader in an apparatus for preparing a beverage, provides data e.g. relating to the type of RGC contained within the container which can be used to control the operation of the beverage preparation apparatus such as to prepare the beverage in an optimal, default manner, e.g. by adjusting the temperature and amount of hot water to be supplied into the beverage base material chamber and/or the temperature and duration of supplying steam into an amount of milk poured into a cup in dependence of the read data.

Figure 16:
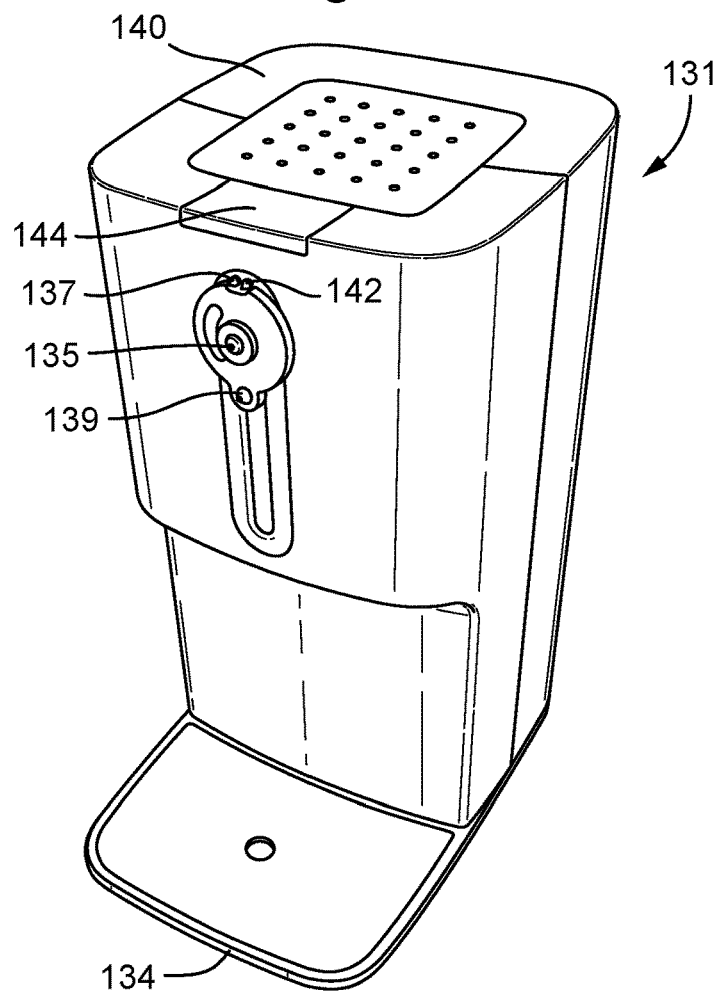
FIG. 16 schematically shows an example of an automatic beverage preparation apparatus in which an inventive froth wand comprising a container can be used in perspective.
Figure 17A:
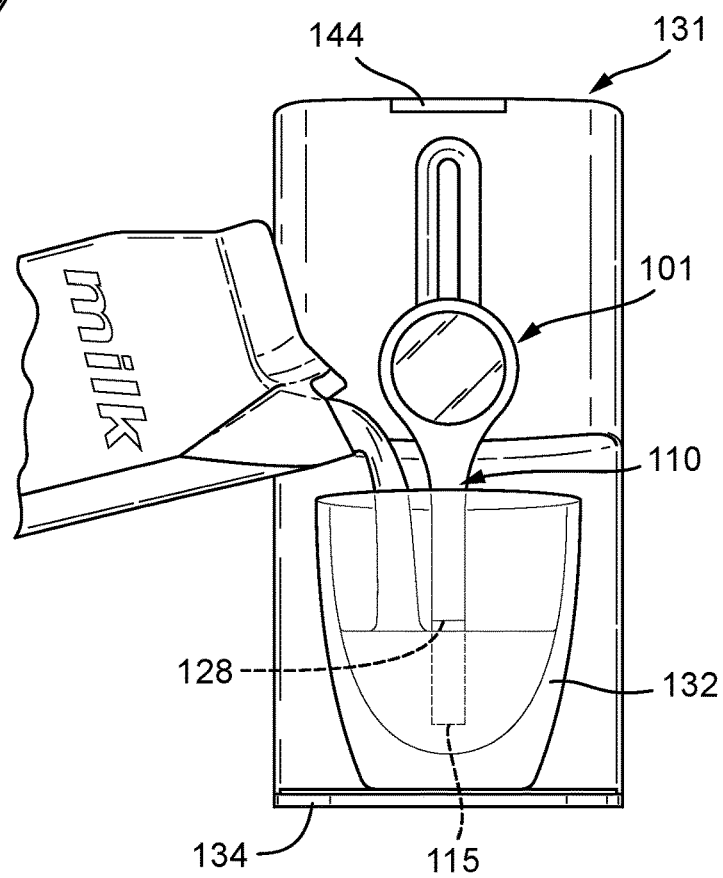
FIG. 17A schematically shows the apparatus of FIG. 16 with an embodiment of a froth wand comprising a container according to the invention in which the container is connected to a froth wand holder of the apparatus in the operative position while milk, as additional ingredient, is poured into a cup in perspective.

In FIG. 16 an automatic beverage preparation apparatus 131 having a froth wand holder 131a to which an inventive froth wand with container can be connected for preparing a beverage is schematically shown in perspective. In FIG. 17A the beverage preparation system in which the froth wand 101 is connected to the apparatus 131 in the operative position is shown, while milk, as additional ingredient, is poured into a cup 132. The system of FIG. 17A is schematically shown in cross-section in FIG. 17B.

The automatic beverage preparation apparatus 131 comprises a water supplying device 133 for supplying water into the RGC chamber 104 of the froth wand 101 and thus the apparatus 131 itself can be free of a brewing chamber. The water supplying device 133 comprises a horizontal support surface 134 and a water supplying nozzle 135 on which the froth wand 101 can be pushed so that the water supplying nozzle 135 penetrates the pierceable water intake portion and the froth wand holder 131a is arranged so that the froth wand 101 is removably connected to the apparatus 131. The froth wand 101 is connected to the automatic beverage preparation apparatus 131 such that the elongated handle 110 is positioned at least substantially vertically with the channel outlet 115 pointing downwards into the cup 132 for dispensing a coffee beverage from the RGC chamber 104 in a substantially vertical direction. The apparatus 131 is also provided with a water bypass supplying device 136 having a water bypass supplying nozzle 137 which pierces the pierceable water bypass intake portion upon connecting the froth wand 101 to the automatic beverage preparation apparatus 131 and with a steam supplying device 138 having a steam conduit 138a connected to a steam supplying nozzle 139 which pierces the pierceable steam inlet portion of the container upon connection of the froth wand 101 to the automatic beverage preparation apparatus 131. The water needed for the devices 133, 136 and 138 can be provided by a detachable water reservoir 140 which communicates with water holders 141, 141', 141" of the devices 133, 136 and 138, respectively.

As shown in FIG. 16 the automatic beverage preparation apparatus 131 also comprises an aroma vent piercer 142 which pierces the pierceable aroma vent portion upon connection of the container to the automatic beverage preparation apparatus 131. In this manner aroma produced during preparation of the beverage by extraction can escape through the aroma vent portion to provide a user with an increased taste and smell sensation.

A control device 143 is included in the apparatus 131 for controlling the operation of the water and steam supply devices 133, 136, 138. The control device 143 and/or the apparatus 131 can be switched on by means of an on/off switch 144 e.g. at the top of the apparatus 131, but in order to ensure reproducible and safe use of the apparatus 131, the beverage preparation system is arranged for enabling operation by means of the control device 143 only after the froth wand 101 has been connected to the froth wand holder 131a of the automatic beverage preparation apparatus 131. Such connection can e.g. be established by means of detectors 145, 146. In the example shown in FIG. 17 the apparatus 131 is arranged such that the nozzles 135, 137 and 139 and the aroma vent 142 are displaceably mounted between an upper connecting position CP indicated with full lines in FIG. 17B and a lower activating position AP indicated with broken lines in FIG. 17B. The apparatus 131 comprises a sensor 147 which can establish whether the nozzles are in the upper connecting position CP or in the lower activating position AP and which sends signals to the control device 143 indicative of the position in which the nozzles are present. In this manner the said beverage preparation system can be arranged for enabling operation by means of the control device 143 only when the nozzles are in the activating position.

The automatic beverage preparation apparatus 131 comprises a reader for reading data from the identifier 130 of the froth wand 101, which reader in the present example is formed by the detectors 145, 146. The reader 145, 146 provides a signal indicative of the read identifier to the control device 143 which can control the operation of the automatic beverage preparation apparatus 131 in dependence on said read data. In particular the control device 143 can comprise a (not-shown) memory which contains processing profiles which are tailored for a particular type of roasted ground coffee. Each of these processing profiles can instruct the control device 143 to control the device supply devices 133, 136 and 138 for, in use, performing a respective default process on the particular type of roasted ground coffee which processing profile is selected upon reading the identifier 130. In this manner e.g. the amount and temperature of hot water which is to be supplied to the chamber 104 can be automatically set by the control device 143 upon reading the identifier. In addition as an alternative or in addition to the on/off switch 144 the apparatus 131 can comprise a user control panel in which the user can set his or her own processing profiles or preferences which overrule the processing profiles stored in the memory of the control device.

The beverage preparation apparatus as shown in FIG. 17 comprises a beverage temperature sensor 150 for sensing a temperature of the beverage dispensed or present in the cup 149 The temperature sensor 150 is operationally connected to the control device for supplying thereto a signal indicative for the measured beverage temperature. The control device 143 may be arranged for controlling the beverage preparation apparatus based on the signal indicative for the measured beverage temperature. In particular, the supply of steam can be controlled based on the measured temperature. In a particular example the beverage temperature sensor 150 comprises at least one microphone 150A, which in the shown example is positioned above the cup.

Figure 17B:
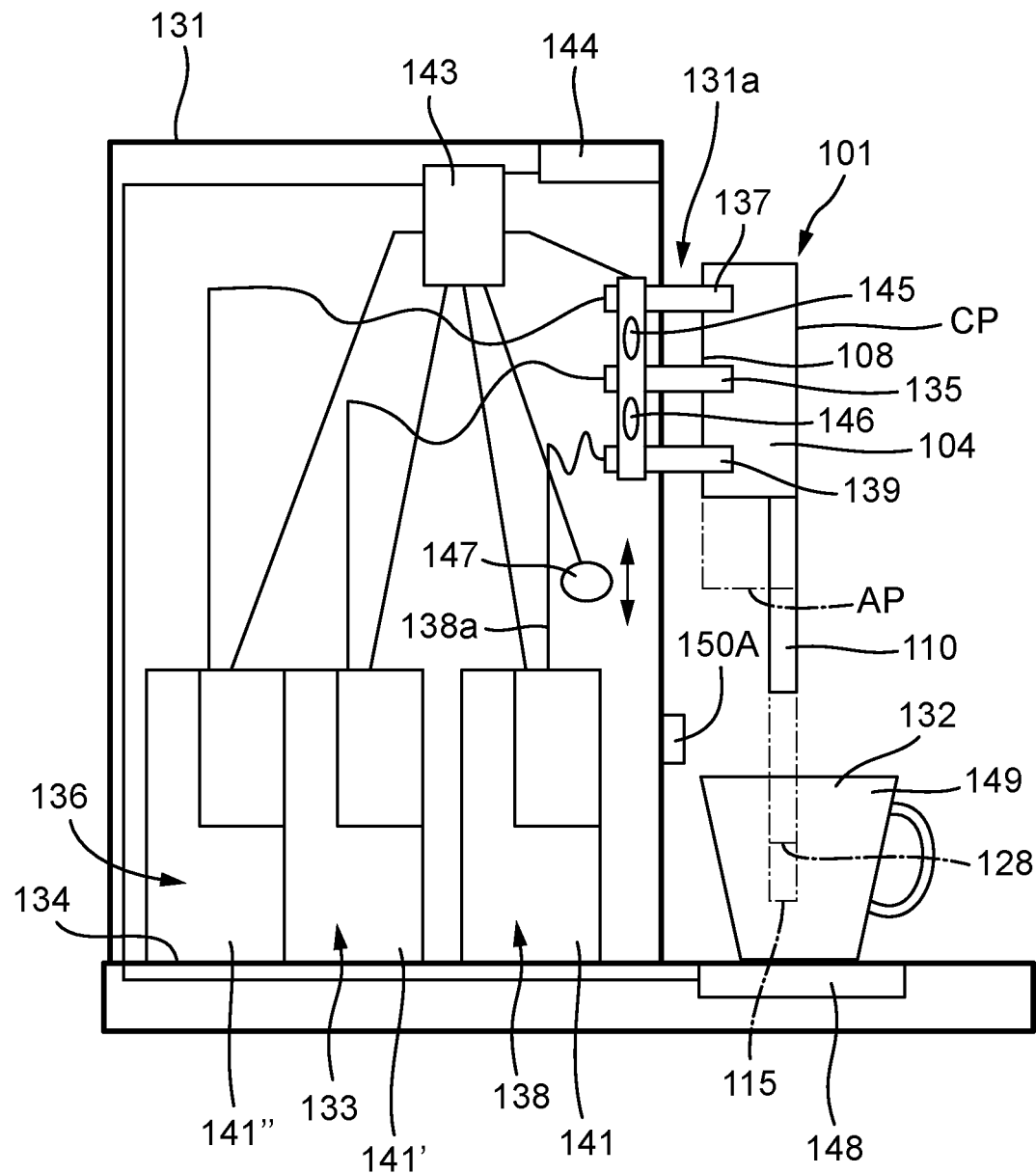
FIG. 17B schematically shows the apparatus and froth wand of FIG. 17A in cross-section.

In FIG. 17B it is indicated that the automatic beverage preparation apparatus 131 comprises a milk amount detector 148, in this example a weighing scale for detecting the amount of milk which is present in a cup 149. The milk amount detector 148 supplies a signal to the control device 143 indicative for the detected amount. The control device 143 can then control the operation of the steam supplying device 138 in dependence on the amount of milk in the cup 149.

In FIGS. 18A-18F a third embodiment of a froth wand (called third froth wand in the following) according to the invention is shown and parts of the third froth wand which are similar to the first and second embodiment are indicated by the same reference numbers.

The third froth wand 101 includes a base body 102 and a cover 103 (FIG. 18E). The base body 102 is molded from as PLA and comprises an RGC chamber 104 defined by a chamber bottom 105 and a chamber wall 106 at the perimeter of the chamber bottom 105. Although in the shown embodiment the wall has a circular circumference, in other embodiments the wall may have other shapes, such as of a polygon or an oval. The chamber 104 of the base body is open at the side opposite the chamber bottom 105 for receiving an amount of RGC preferably equivalent to an amount for a single serving of coffee.

The chamber wall 106 has a sealing surface 107 at its free end opposite the chamber bottom 105, such that the cover 103 can be attached to the sealing surface 107 of the chamber wall 106 for closing the RGC chamber 104. The cover 103 is in this embodiment formed by a perforated membrane or porous filter 103A and a cover element 103B. The cover element 103B is dome shaped above the RGC chamber 104 while the membrane or porous filter 103A is flat, thereby forming an additional chamber 104A in which an additional beverage base material, preferably different from roasted ground coffee in the chamber 104, can be contained.

The froth wand 101 further comprises an intake opening 108 for taking in water into the RGC chamber 104, which intake opening is formed by a pierceable water intake portion 108 provided in the chamber bottom 105. The third froth wand 101 further comprises an extraction medium inlet pipe 108A extending from the pierceable extraction medium intake portion 108 into the beverage base material chamber, preferably up to the perforated membrane or porous filter 103A. In this manner extraction medium is provided to the additional beverage base material and then flows to the RGC in the chamber 104 via the perforated membrane or porous filter. The froth wand 101 in addition comprises a dispensing hole 109 in the chamber wall 106 for dispensing a coffee beverage from the RGC chamber 104. In front of dispensing hole 109 within the chamber 104 a grid G and a filter sheet F are provided to prevent clogging of the opening 109.

Figure 18C:
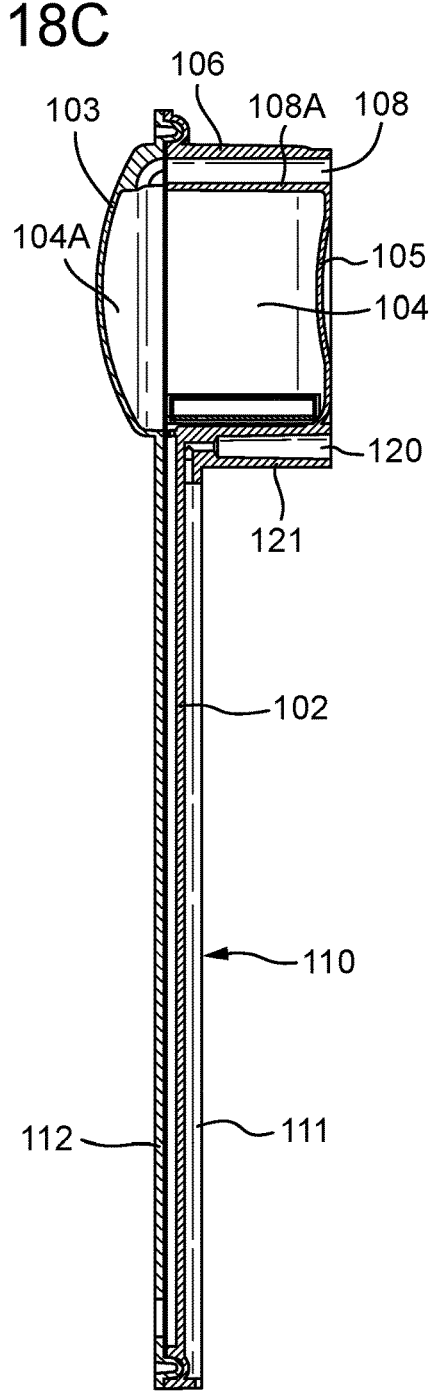
FIG. 18C shows the third embodiment of the froth wand comprising a container according to FIG. 18B in cross-section.
Figure 18D:
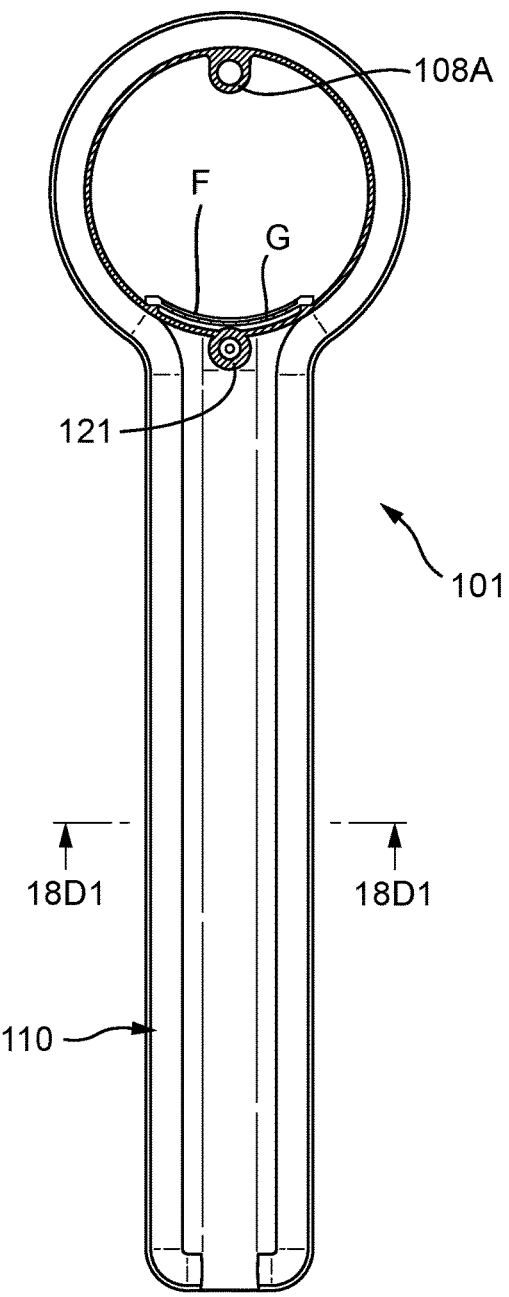
FIG. 18D shows the third embodiment of the froth wand comprising a container according to the invention in a view showing the top of the container with the cover removed.
Figure 18D:
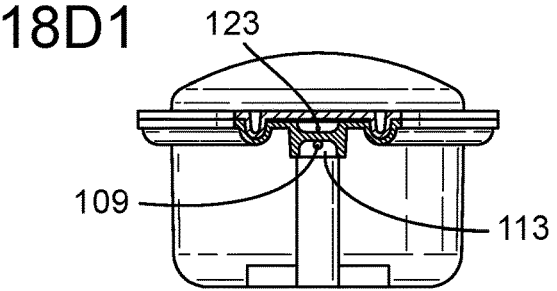
Figure 18F:
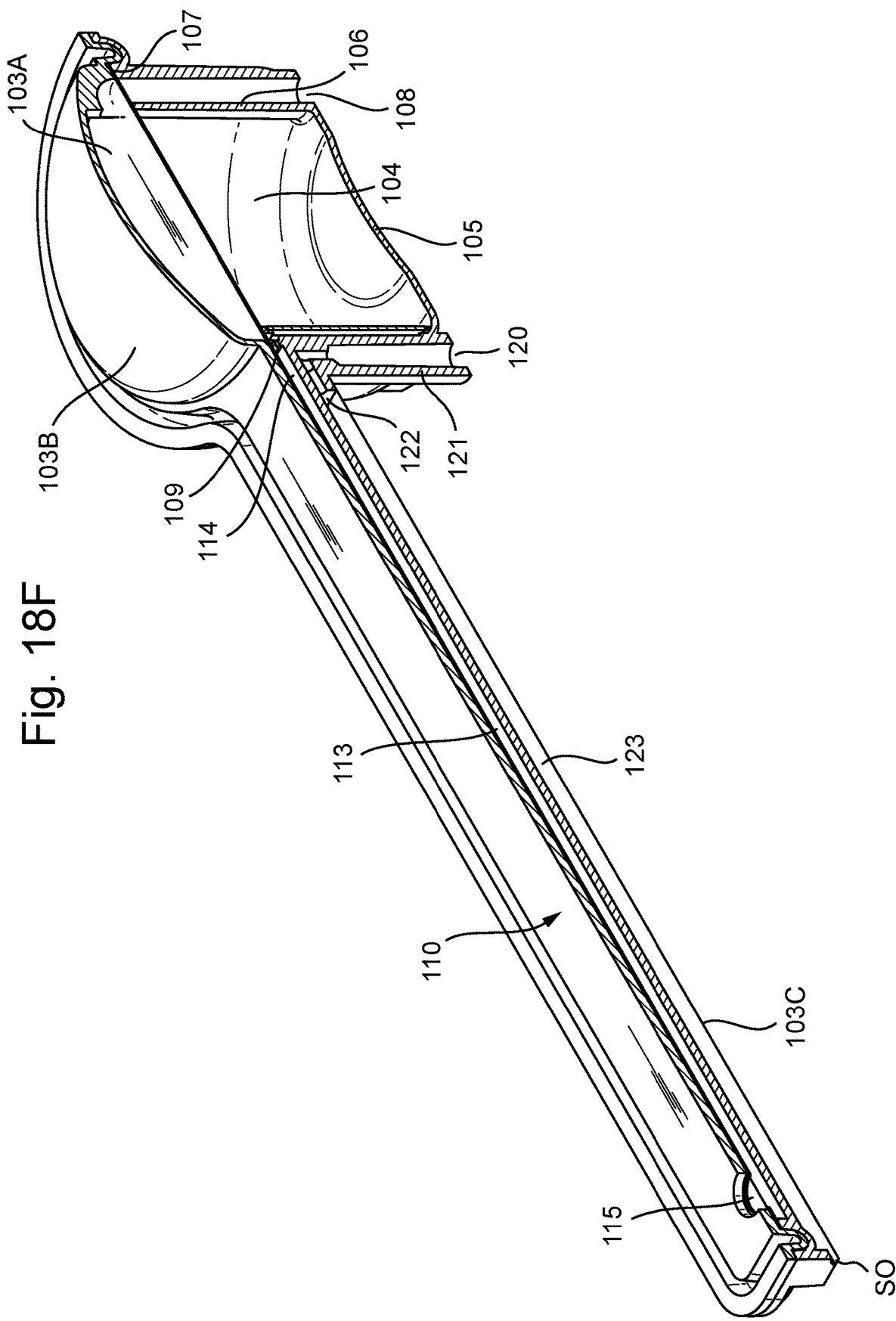
FIG. 18F shows the third embodiment of the froth wand comprising a container according to the invention in a perspective view and broken away.
Figure 19C:
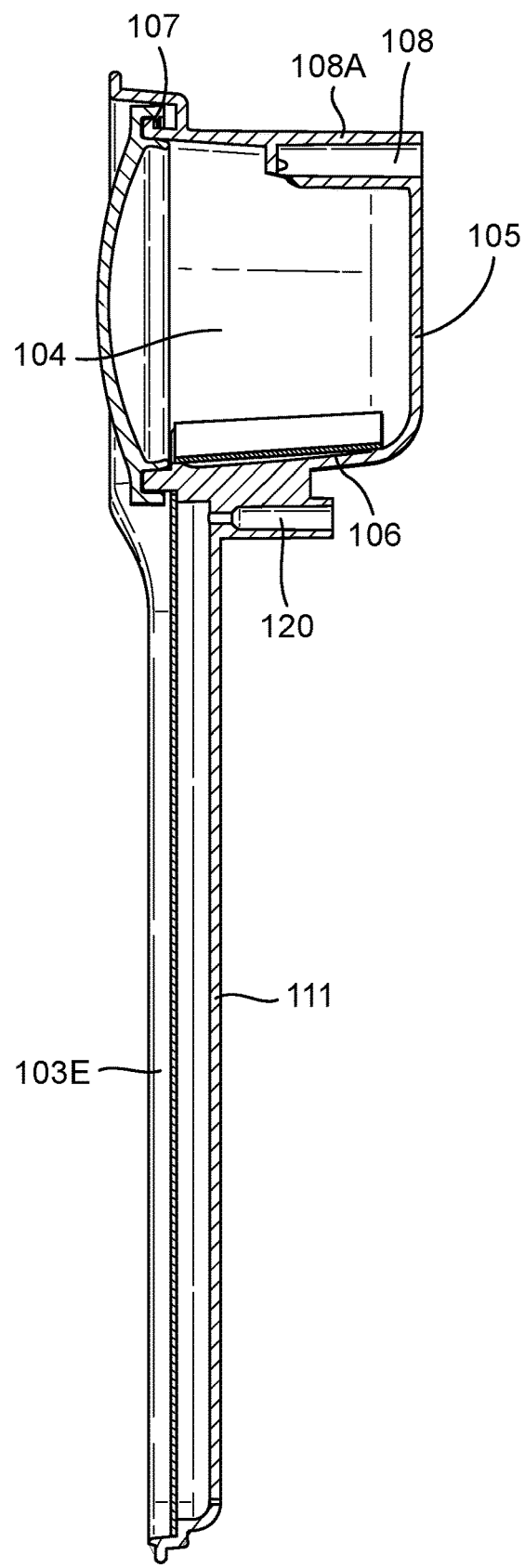
FIG. 19C shows the fourth embodiment of the froth wand comprising a container according to FIG. 19B in cross-section.
Figure 19D:
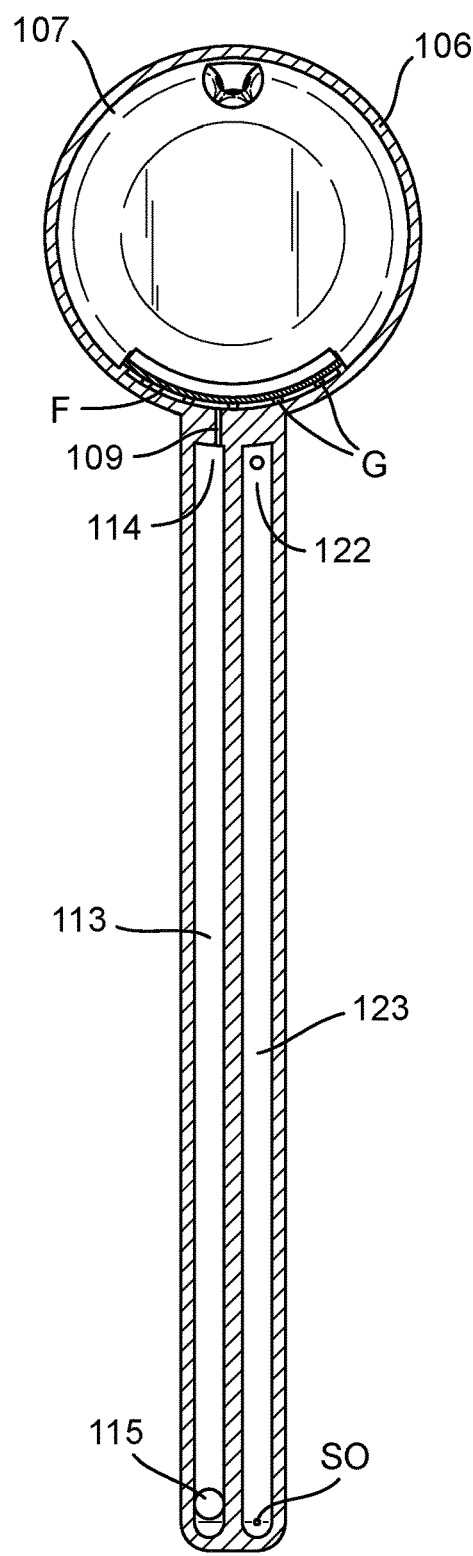
FIG. 19D shows the fourth embodiment of the froth wand comprising a container according to the invention in a view showing the top of the container with the cover removed.
Figure 19E:
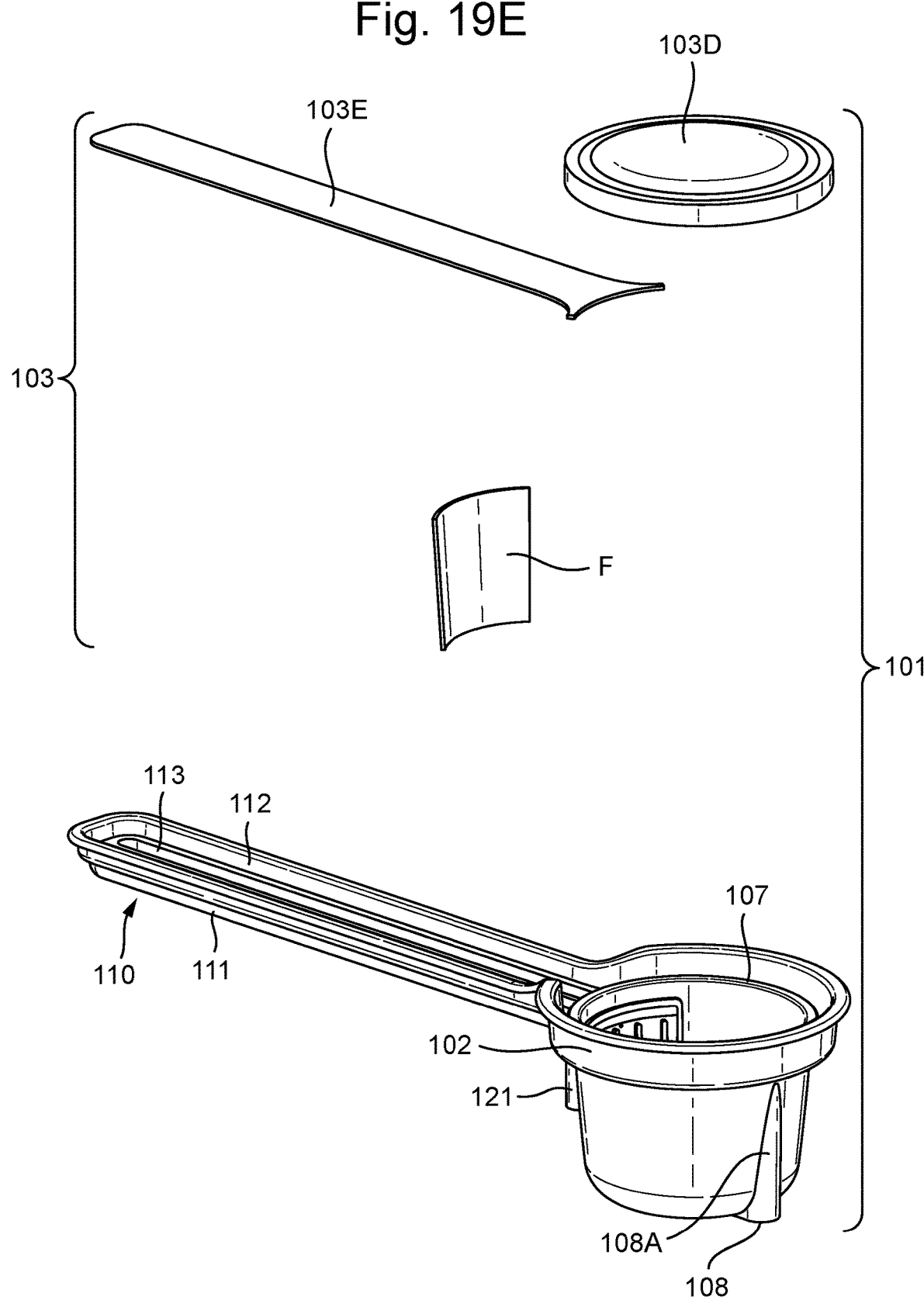
FIG. 19E shows the fourth embodiment of the froth wand comprising a container according to the invention in an exploded view in perspective The invention will be described below also with reference to examples of devices and systems for heating and frothing a beverage using the inventive froth wand to make structural features of the inventive froth wand more clear. It will be clear that the inventive froth wand can be used in other devices and systems.

The elongated handle 110 extends in a direction having a radial component outward from the beverage base material chamber 104. The elongated handle 110 is integral with the base body 102 and comprises a handle bottom 111 and a handle sealing flange 112A, B. The handle 110 is provided with an outlet channel 113 (see also FIG. 18D1) extending from an upstream channel inlet 114 communicating with the dispensing opening 109 to a downstream channel outlet 115 provided at the free end of the handle 110. The handle sealing flange 112 is flush with the sealing surface 107 of the chamber wall 106 so that the cover 103 can also be attached to the sealing flange 112 of the handle 110 for closing the outlet channel 113 in a direction opposite the handle bottom 111. As can be seen in FIG. 18F the sealing flange 112 of the handle 110 covers the outlet channel 113. The upstream channel inlet 114 directly communicates with the dispensing hole 109 to obtain a compact froth wand 101.

In the embodiment of the third froth wand 101 shown in FIGS. 18A-F the chamber bottom 105 is further provided with a pierceable steam inlet portion 120 which via a steam inlet pipe 121 leads to an upstream steam channel inlet 122 of a steam outlet channel 123 positioned below the outlet channel 113 which are both provided in the handle 110. The steam outlet channel 123 ends in a downstream steam channel outlet SO provided at the free end of the handle 110.

As can be seen in FIGS. 18E and 18F a cover part 103C also closes off the steam channel 123 in a direction opposite the handle bottom 111. In this manner the froth wand 101 itself can be used to supply steam, e.g. into fresh milk poured into a cup to prepare milk foam.

In FIGS. 19A-19E a fourth embodiment of a froth wand with container (called fourth froth wand in the following) according to the invention is shown and parts of the fourth froth wand which are similar to the first, second and third embodiment are indicated by the same reference numbers.

The fourth froth wand 101 includes a base body 102 and a cover 103 comprising a disc shaped part 103D and an elongate part 103E. The base body 102 is molded from as PLA and comprises an RGC chamber 104 defined by a chamber bottom 105 and a chamber wall 106 at the perimeter of the chamber bottom 105. Although in the shown embodiment the wall has a circular circumference, in other embodiments the wall may have other shapes, such as of a polygon or an oval. The chamber 104 of the base body is open at the side opposite the chamber bottom 105 for receiving an amount of RGC preferably equivalent to an amount for a single serving of coffee.

The chamber wall 106 has a sealing surface 107 at its free end opposite the chamber bottom 105, such that the disk shaped cover part 103D can be attached to the sealing surface 107 of the chamber wall 106 for closing the RGC chamber 104.

The fourth froth wand 101 further comprises an intake opening 108 for taking in water into the RGC chamber 104, which intake opening is formed by a pierceable water intake portion 108 provided in the chamber bottom 105. The fourth froth wand 101 further comprises an extraction medium inlet pipe 108A extending from the pierceable extraction medium intake portion 108 into the beverage base material chamber, preferably up to half the height of the chamber 104. In this manner extraction medium is provided in the additional beverage base material for a correct extraction. The fourth froth wand 101 in addition comprises a dispensing hole 109 in the chamber wall 106 for dispensing a coffee beverage from the RGC chamber 104. In front of dispensing hole 109 within the chamber 104 a grid G and a filter sheet F are provided to prevent clogging of the opening 109.

The tubular wall of the fourth froth wand furthermore forms an elongated handle 110 extending in a direction having a radial component outward from the beverage base material chamber 104. The elongated handle 110 is integral with the base body 102 and comprises a handle bottom 111 and a handle sealing flange formed by cover part 103E. The handle 110 is provided with an outlet channel 113 extending from an upstream channel inlet 114 communicating with the dispensing opening 109 to a downstream channel outlet 115 provided at the free end of the handle 110. The handle sealing flange 112 is flush with the sealing surface 107 of the chamber wall 106 so that the cover 103 can also be attached to the sealing flange 112 of the handle 110 for closing the outlet channel 113 in a direction opposite the handle bottom 111. The upstream channel inlet 114 directly communicates with the dispensing hole 109 to obtain a compact fourth froth wand 101.

In the embodiment of the fourth froth wand 101 shown in FIGS. 19A-E the chamber bottom 105 is further provided with a pierceable steam inlet portion 120 which via a steam inlet pipe 121 leads to an upstream steam channel inlet 122 of a steam outlet channel 123 positioned adjacent the outlet channel 113 which are both provided in the handle 110. The steam outlet channel 123 ends in a downstream steam channel outlet SO provided near the free end of the handle 110.

The invention claimed is:

1. A froth wand comprising:
    a tubular wall having a steam inlet end comprising a steam inlet,
    a steam outlet end comprising a steam outlet separate from the steam inlet, and
    a steam channel extending between the steam inlet and the steam outlet,
    the froth wand is a disposable froth wand characterised in that the disposable froth wand is made of biodegradable material.

2. The froth wand according to claim 1, wherein the steam outlet extends radially through the tubular wall and/or is arranged at a free end of the froth wand extending in longitudinal direction.

3. The froth wand according to claim 1, wherein the steam outlet is a circular opening having a diameter of between 1.0 mm and 2.0 mm.

4. The froth wand according to claim 1, wherein the steam outlet comprises a plurality of steam outlet openings.

5. The froth wand according to claim 1, wherein the steam channel has a diameter of between 4 mm and 10 mm and/or the tubular wall of the froth wand has a thickness of between 0.4 and 0.6 mm, preferably a 0.5 mm wall thickness.

6. The froth wand according to claim 1, wherein the froth wand is made of a material having a low thermal mass in a range of 1 to 20 gram.

7. The froth wand according to claim 1, wherein the tubular wall of the froth wand comprises an air opening, wherein the air opening comprises one or more holes, and wherein at least one or each of the holes is shaped as a slot extending parallel to a longitudinal axis of the tubular wall.

8. A froth wand according to claim 1, wherein the froth wand comprises a circulation channel provided on the tubular wall near the steam outlet end of the froth wand, said circulation channel having an intake opening and a separate outlet opening which latter is positioned adjacent the steam outlet, said circulation channel being preferably substantially parallel to the steam channel of the froth wand.

9. The froth wand according to claim 1, wherein the froth wand comprises a container for containing a beverage base material, said container including a base body and a cover, said base body comprising a beverage base material chamber defined by a chamber bottom and a chamber wall at the perimeter of the chamber bottom, the chamber of the base body being open at the side opposite the chamber bottom, said chamber wall being provided with a sealing surface at its free end opposite the chamber bottom, the cover being attached to the sealing surface of the chamber wall for closing the beverage base material chamber, said container comprising an intake opening for taking in an extraction medium to the beverage base material chamber and a dispensing opening for dispensing a beverage from the beverage base material chamber.

10. The froth wand according to claim 9, wherein the tubular wall forms an elongated handle extending in a direction having a radial component outward from the beverage base material chamber, said elongated handle being integral with the base body and comprising a handle bottom and a handle sealing flange which is flush with the sealing surface of the chamber wall, said handle being provided with an outlet channel extending from an upstream channel inlet communicating with the dispensing opening to a downstream channel outlet provided at the free end of the handle, said cover being furthermore attached to the sealing flange of the handle for closing the outlet channel in a direction opposite the handle bottom.

11. The froth wand according to claim 9, wherein said intake opening for taking in an extraction medium to the beverage base material chamber is formed by a pierceable extraction medium intake portion provided in the chamber bottom.

12. The froth wand according to claim 9, wherein the steam inlet is provided in the container, said steam inlet having a pierceable steam inlet portion, wherein the steam channel extends in the handle from an upstream steam channel inlet to a downstream steam channel outlet provided at the free end of the handle, wherein the container is further provided with a steam inlet pipe extending from the pierceable steam inlet portion to the upstream steam channel inlet of the steam channel outlet of the handle, and wherein said cover is furthermore attached to the sealing flange of the handle for closing the steam channel in a direction opposite the handle bottom.

13. The froth wand according to claim 9, wherein the container is provided with an identifier provided with data.

14. The froth wand according to claim 9, wherein the base body is molded from bio plastics.

15. The froth wand according to claim 14, wherein the bio plastics is PLA (TBC).

* * * * *